United States Patent
Takahashi et al.

(10) Patent No.: US 9,045,116 B2
(45) Date of Patent: Jun. 2, 2015

(54) BRAKE SYSTEM

(75) Inventors: Yu Takahashi, Toyota (JP); Daisuke Nakata, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 38 days.

(21) Appl. No.: 14/113,204

(22) PCT Filed: Apr. 22, 2011

(86) PCT No.: PCT/JP2011/059929
§ 371 (c)(1),
(2), (4) Date: Oct. 21, 2013

(87) PCT Pub. No.: WO2012/144065
PCT Pub. Date: Oct. 26, 2012

(65) Prior Publication Data
US 2014/0052339 A1 Feb. 20, 2014

(51) Int. Cl.
 *B60T 8/17* (2006.01)
 *B60T 8/00* (2006.01)
 *B60T 8/1761* (2006.01)
 *B60T 7/04* (2006.01)
 *B60T 8/40* (2006.01)
 *B60T 13/14* (2006.01)
 *B60T 13/66* (2006.01)
 *B60T 13/68* (2006.01)

(52) U.S. Cl.
 CPC . *B60T 8/17* (2013.01); *B60T 7/042* (2013.01); *B60T 8/00* (2013.01); *B60T 8/4081* (2013.01); *B60T 13/146* (2013.01); *B60T 13/662* (2013.01); *B60T 13/686* (2013.01)

(58) Field of Classification Search
None
See application file for complete search history.

(56) References Cited

U.S. PATENT DOCUMENTS

| | | | | |
|---|---|---|---|---|
| 4,643,485 A * | 2/1987 | Leiber | 303/145 |
| 5,188,432 A * | 2/1993 | Schmitt et al. | 303/147 |
| 5,224,765 A * | 7/1993 | Matsuda | 303/9.62 |
| 5,611,606 A * | 3/1997 | Nell et al. | 303/155 |
| 5,634,698 A * | 6/1997 | Cao et al. | 303/146 |
| 5,745,862 A * | 4/1998 | Hirano | 701/1 |
| 5,762,157 A * | 6/1998 | Uehara | 180/197 |
| 5,863,105 A * | 1/1999 | Sano | 303/146 |
| 6,122,584 A * | 9/2000 | Lin et al. | 701/70 |
| 6,132,014 A * | 10/2000 | Kiso et al. | 303/146 |
| 6,416,140 B1 * | 7/2002 | Yamamoto et al. | 303/122 |

(Continued)

FOREIGN PATENT DOCUMENTS

| | | |
|---|---|---|
| JP | 2002-79933 | 3/2002 |
| JP | 2005-28975 | 2/2005 |
| JP | 2007-276579 | 10/2007 |

*Primary Examiner* — Rami Khatib
*Assistant Examiner* — Navid Ziaeianmehdizadeh
(74) *Attorney, Agent, or Firm* — Finnegan, Henderson, Farabow, Garrett & Dunner, LLP

(57) ABSTRACT

A brake system includes: (a) friction brakes provided for at least two wheels that are at least two of a plurality of wheels of a vehicle; (b) a relative-phase obtaining device configured to obtain at least one relative phase each of which is a relative phase between corresponding two of the at least two wheels; and (c) a change-characteristic obtaining device configured to obtain a total-braking-force change characteristic that is a relationship between the relative phase obtained by the relative-phase obtaining device and a value representative of state of change of a total braking force during at least one rotation of the at least two wheels. The total braking force includes braking forces of the friction brakes provided for the at least two wheels.

18 Claims, 21 Drawing Sheets

(56) References Cited

U.S. PATENT DOCUMENTS

| | | | |
|---|---|---|---|
| 6,446,490 B1* | 9/2002 | Lohner et al. | 73/39 |
| 6,913,326 B1* | 7/2005 | Ohkubo et al. | 303/11 |
| 7,878,605 B2* | 2/2011 | Kokubo et al. | 303/151 |
| 8,731,795 B2* | 5/2014 | Frashure et al. | 701/94 |
| 2001/0020800 A1* | 9/2001 | Isono et al. | 303/113.1 |
| 2004/0262994 A1* | 12/2004 | Baumann et al. | 303/155 |
| 2006/0170281 A1* | 8/2006 | Hattori et al. | 303/20 |
| 2010/0253137 A1* | 10/2010 | Matsuzaki et al. | 303/155 |
| 2011/0049973 A1* | 3/2011 | Wuerth et al. | 303/10 |
| 2011/0224881 A1* | 9/2011 | Matsushita | 701/70 |
| 2012/0065816 A1* | 3/2012 | Cahill | 701/3 |
| 2012/0179349 A1* | 7/2012 | Yamakado et al. | 701/89 |
| 2012/0212043 A1* | 8/2012 | Miyata et al. | 303/9.62 |
| 2012/0226417 A1* | 9/2012 | Nishikawa | 701/42 |
| 2012/0319465 A1* | 12/2012 | Koyama | 303/3 |
| 2013/0085650 A1* | 4/2013 | Nakamura et al. | 701/71 |
| 2013/0127236 A1* | 5/2013 | Hakiai et al. | 303/3 |
| 2013/0226410 A1* | 8/2013 | Narita et al. | 701/41 |
| 2014/0088848 A1* | 3/2014 | Owen et al. | 701/70 |

* cited by examiner

BRAKE SYSTEM

CROSS-REFERENCE TO RELATED APPLICATIONS

This application is a national phase application of International Application No. PCT/JP2011/059929, filed Apr. 22, 2011, the content of which is incorporated herein by reference.

TECHNICAL FIELD

The present invention relates to a brake system including friction brakes.

BACKGROUND ART

Patent Document 1 discloses a brake device equipped with drum brakes and disk brakes wherein a hydraulic pressure of a brake cylinder of each drum brake and a hydraulic pressure of a brake cylinder of each disk brake are controlled in accordance with respective rules that are different from each other. Since a pulsation is easily caused in each drum brake, a control dead zone width is made large, for example, so that switching between a pressure increase control and a pressure reduction control is hardly caused. Thus, it is possible to suppress a control hunting that would be caused by the pulsation.

Patent Document 2 discloses a brake device equipped with an electric drum brake wherein a torque variation of the electric drum brake which is caused by a wheel rotation is detected, and a supply of an electric current to an electric motor is controlled in a manner that reduces the torque variation.

Patent Document 3 discloses a technique relating to switching from a regenerative braking mode or cooperative braking mode in which a regenerative braking torque is applied to the wheel, to a friction braking mode in which only a friction braking torque is applied to the wheel. According to the disclosed technique, the braking mode is switched for left-side and right-side wheels at respective phases that are shifted from each other. That is, the regenerative braking mode or cooperative braking mode is switched to the friction braking mode for the left-side and right-side wheels at respective different points of time, for thereby reducing change of deceleration and alleviating an uncomfortable feeling given to the vehicle operator.

PRIOR ART DOCUMENTS

Patent Documents

[Patent Document 1] JP-2005-028975A
[Patent Document 2] JP-2002-079933A
[Patent Document 3] JP-2005-276579A

DISCLOSURE OF THE INVENTION

Object to be Achieved by the Invention

An object of the present invention is to suppress a control hunting in a brake system including friction brakes.

Measures for Achieving the Object and Effect

In a brake system according to the present invention, a change characteristic that is a relationship between (i) a relative phase between each two of at least two wheels that are at least two of a plurality of wheels of a vehicle and (ii) a value representative of state of change of a total braking force including braking forces of friction brakes provided for the at least two wheels, during at least one rotation of the at least two wheels, is obtained.

For example, in a case where each of the friction brakes is a drum brake with a degree of roundness of a drum being low or with the drum being attached eccentrically, a braking force is periodically changed with rotation of the wheel, although the braking force should be essentially constant. Further, such a periodical change of the braking force is caused in each wheel, and an amplitude of change of a resultant of the braking forces of the drum brakes provided for the at least two wheels (i.e., an example of the total braking force) is increased or reduced depending on a relative phase between the two wheels.

However, if the relative phase between the two wheels is adjusted to a value that reduces the amplitude of the total braking force, it is possible to reduce the amplitude of the periodical change of the total braking force and accordingly to suppresses a control hunting that could be caused by the periodical change of the total braking force.

CLAIMABLE INVENTION

There will be described a claimable invention.

(1) A brake system comprising:

friction brakes provided for at least two wheels that are at least two of a plurality of wheels of a vehicle;

a relative-phase obtaining device configured to obtain at least one relative phase each of which is a relative phase between corresponding two of the at least two wheels;

a change-characteristic obtaining device configured to obtain a total-braking-force change characteristic that is a relationship between the relative phase obtained by the relative-phase obtaining device and a value representative of state of change of a total braking force during at least one rotation of the at least two wheels, the total braking force including braking forces of the friction brakes provided for the at least two wheels; and a rotational-angle control device configured to cause the relative phase to become close to a target relative phase by controlling a rotational angle of at least one of the at least two wheels, the target relative phase being determined based on the total-braking-force change characteristic obtained by the change-characteristic obtaining device.

The friction brake may be either a hydraulic brake including a pressing device configured to cause a friction engaging member to be pressed against a brake rotary body by a hydraulic force, or an electric brake including a pressing device configured to cause a friction engagement member to be pressed against a brake rotary body by an electromagnetic driving force generated by an electric motor or the like.

The relative-phase obtaining device is provided for obtaining at least one relative phase each of which is a relative phase between a corresponding two of the at least two wheels. In a case where the relative-phase obtaining device is to obtain relative phases among three wheels, the relative-phase obtaining device is configured to obtain a relative phase between two of the three wheels and another relative phase between two of the three wheels. For example, where the three wheels consist of wheels A, B and C, a relative phase between the wheels A and B and a relative phase between the wheels B and C are obtained. By obtaining the relative phase between the wheels A and B and the relative phase between the wheels B and C, a relative phase A and C is uniquely determined.

The total braking force, which includes the braking forces of the friction brakes provided for the at least two wheels, may include a braking force that is other than the braking forces of the friction brakes provided for the at least two wheels. For example, when a value of the other braking force is small or when the value of the other braking force is not changed by a large degree during one rotation of the wheels, the state of change of the total braking force can be accurately obtained even where the total braking force includes the other braking force.

The total braking force may be obtained either (i) by directly detecting the total braking force as such, or (ii) by detecting the braking forces of the friction brakes provided for the at least two wheels independently of each other and summing the braking forces detected independently of each other.

The change characteristic may be obtained either during running of the vehicle, or in a manufacturing facility, for example, prior to shipment of the vehicle.

The value representative of the change state may be a maximum value of an amplitude of the total braking force, a value (e.g., variance) representative of deviation or variation of the total braking force with respect to an average value of the total braking force during one rotation of the wheels, or other value that is obtained by statistically processing a value of the total braking force during one rotation of the wheels.

The rotational-angle control device is configured to control a force acting on a wheel in a longitudinal direction of the vehicle so as to control the rotational velocity of the wheel, for thereby controlling the rotational angle of the wheel, such that the relative phase becomes close to the target relative wheel. The rotational-angle control device may be arranged either to control a braking force applied to the wheel, or control a driving force applied to the wheel. In this sense, the rotational-angle control device may be referred to as a rotational-velocity control device or a relative-phase control device.

It is preferable that the target relative phase is determined as the relative phase that is established in a case where the value representative of the change state of the total braking force during one rotation of the wheels is not larger than a given value. The target relative phase may be, for example, the relative phase that is established in a case where the maximum value of the amplitude of the total braking force is not larger than a given value or the relative phase that is established in a case where a value representative of variation of the total braking force is not larger than a given value.

It is noted that the term "phase" of "the braking mode is switched at phases that are shifted from each other" described in the Patent Document 3, is interpreted to not mean a difference of the rotational angles between a plurality of wheels but mean a difference in time of switching, in view of spirit of the invention disclosed in the Patent Document 3. Thus, the description of the Patent Document 3 does not have relation with the invention of the present application.

(2) The brake system according to mode (1), wherein the change-characteristic obtaining device includes (a) a variance obtaining portion configured to obtain a variance of the total braking force as the value representative of state of change of the total braking force during at least one rotation of the at least two wheels and (b) a variance-utilization change-characteristic obtaining portion configured to obtain, as the change characteristic, a relationship between the relative phase and the variance obtained by the variance obtaining portion.

It is possible to know that the variation of the total braking force during one rotation of the at least two wheels is small where the variance is small, and that the variation is large where the variance is large. In other words, it is possible to know that the change of the total braking force (i.e., the amplitude of the total braking force) during one rotation of the at least two wheels is small where the variance is small, and that the change of the total braking force during one rotation of the at least two wheels is large where the variance is large.

(3) The brake system according to mode (1) or (2), wherein the change-characteristic obtaining device includes a change-characteristic storing portion configured to store therein the obtained total-braking-force change characteristic.

The obtained total-braking-force change characteristic is stored in the change-characteristic storing portion.

(4) The brake system according to any one of modes (1)-(3), wherein the change-characteristic obtaining device includes a total-braking-force obtaining portion configured to obtain the total braking force in a state in which the relative phase obtained by the relative-phase obtaining device is constant.

It is considered that the relative phase between the corresponding two wheels is kept constant, for example, when a rotational velocity of each of the corresponding two wheels is constant and the rotational velocities of the corresponding two wheels are substantially equal to each other.

(5) The brake system according to any one of modes (1)-(4), wherein the change-characteristic obtaining device includes a total-force obtaining portion configured to obtain the total braking force in a state in which the total braking force is constant in an assumed case when the at least two wheels are not rotated.

The total braking force is obtained in the state in which the braking forces of the friction brakes provided for the at least two wheels are kept constant, namely, in the state in which each of the braking forces is not changed by any other factor other than change of a distance between the friction engagement member and the brake rotary body, which is caused by rotation of the corresponding wheel.

It is considered that the above-described state is established upon establishment of at least one of a plurality of states that include, for example, (i) a state in which the braking force is kept constant while the wheels are not being rotated, (ii) a state in which the braking force is not changed by a control and (iii) a state in which the vehicle is running straight on a rod surface that is other than a gravel road and a straddle road. Specifically, where the friction brake is to be activated by a hydraulic pressure of a brake cylinder, as an example of the above-described state, there is a state in which a closed region including the brake cylinder is formed. In the closed region, the hydraulic pressure of the brake cylinder is changed due to a volumetric change of a cylinder chamber which is caused by change of the distance between the brake rotary body and the friction engaging member during rotation of the wheel. Further, where the friction brake is to be activated by a pressing force of an electric motor, as an example of the above-described state, there is a state in which an electric current supplied to the electric motor is kept constant.

(6) The brake system according to any one of modes (1)-(5), wherein the change-characteristic obtaining device includes a running-state-total-braking-force obtaining portion configured to obtain the total braking force upon satisfaction of a change-characteristic obtaining condition during running of the vehicle.

(7) The brake system according to mode (6), wherein the running-state-total-braking-force obtaining portion is configured to obtain the total braking force upon satisfaction of the change-characteristic obtaining condition that is to be satisfied when at least one of a plurality of requirements is met, the plurality of requirements including (i) a requirement that an amount of change of a rotational velocity of each of the corresponding two of the at least two wheels is within a given range, (ii) a requirement that an absolute value of difference between rotational velocities of the corresponding two of the at least two wheels is not larger than a given value, (iii) a requirement that the vehicle is not in a turn, (iv) a requirement that the total braking force including the braking forces of the friction brakes provided for the at least two wheels is not smaller than a given value and (v) a requirement that an amplitude of change of each of target values of the braking forces of the friction brakes provided for the at least two wheels is within a given range.

(A) The change characteristic is obtained in a state in which the relative phase between the corresponding two wheels is constant. In a case when the above-described requirements of (i) and (ii) are met, namely, in a case when the rotational velocity of each of the corresponding two wheels is constant and the rotational velocities of the corresponding two wheels are substantially equal to each other, it can be considered that the relative phase between the corresponding two wheels is constant. It can be considered that the requirement of (iii) is conceptually included in the requirement of (ii).

Regarding the requirement of (i), the relative phase is hardly kept constant in a case when the rotational velocity of each of the corresponding two wheels is changed, for example, during running of the vehicle on a gravel road.

Regarding the requirement of (ii), the relative phase is hardly kept constant in a case when the rotational velocities of the corresponding two wheels are different from each other, for example, during running of the vehicle on a straddle road.

Regarding the requirement of (iii), in a case when the vehicle is in a turn, the rotational velocity of an outside wheel and the rotational velocity of an inside wheel are different from each other, so that the relative phase is easily changeable. Whether or not the vehicle is in a turn can be determined based on a steering angle of a steering wheel, a yaw rate or a lateral acceleration.

(B) The change characteristic is obtained in a state in which the total braking force is larger than a given value that is minimally required for enabling recognition of the change state of the total braking force (requirement of (iv)).

(C) The change characteristic is obtained in a state in which the total braking force is naturally expected to be kept constant.

Regarding the requirement of (v), the total braking force is obtained in a state in which the braking force is constant when the wheel is not being rotated, a state in which the target value of the braking force is constant, or a state in which the braking force is not changed by any other factor other than change of a distance between the friction engagement member and a friction surface of the brake rotary body, so that it is possible to accurately obtain the change of the braking force which is caused by rotation of the wheel.

(8) The brake system according to any one of modes (1)-(5), wherein the change-characteristic obtaining device includes an in-facility obtaining portion configured to obtain the change characteristic in a manufacturing facility.

The change characteristic may be obtained in the manufacturing facility and the obtained change characteristic may be stored.

(9) The brake system according to any one of modes (1)-(8), wherein the rotational-angle control device includes a target-relative-phase determining portion configured to determine the target relative phase, based on the relative phase established in a case where the value representative of the state of the change is not larger than a given value.

(10) The brake system according to any one of modes (2)-(9), wherein the rotational-angle control device includes a target-relative-phase determining portion configured to determine the target relative phase, based on the relative phase established in a case where the variance is not larger than a given value.

(11) The brake system according to any one of modes (1)-(10), wherein the rotational-angle control device includes a target-relative-phase determining portion configured to determine the target relative phase based on the total-braking-force change characteristic, such that the determined target relative phase corresponds to the relative phase established in a case where the value representative of the state of the change is minimized.

(12) The brake system according to any one of modes (1)-(11), wherein the rotational-angle control device includes a bottom-value-based target-relative-phase determining portion configured to determine the target relative phase based on the total-braking-force change characteristic, such that the determined target relative phase corresponds to the relative phase established in a case where the value representative of the state of the change is not larger than a given value and a derivative of the value representative of the state of the change, with respect to the relative phase, is zero.

In each of modes (11) and (12), a variance may be employed as the value representative of the state of the change of the total braking force.

(13) The brake system according to any one of modes (1)-(12), wherein the rotational-angle control device includes an actual-relative-phase-based target-relative-phase determining portion configured to determine the target relative phase, based on the relative phase established in a case where the value representative of the state of the change is not larger than a given value and also an actual relative phase between the corresponding two of the at least two wheels.

In each of modes (9), (10) and (12), there may be a plurality of relative phases (hereinafter referred to as "provisional target relative phases") that can satisfy the corresponding condition. In such a case, the target relative phase is determined based on the relative phases satisfying the above condition and also the actual relative phase.

For example, (a) one of the plurality of provisional target relative phases, which is the closest to the actual relative phase, may be determined as the target relative phase, or (b) one of the plurality of provisional target relative phases, which makes the corresponding value representative of the change state be the smallest, may be determined as the target relative phase. Further, (c) where two or more of the plurality of provisional target relative phases are not far from the actual relative phase by more than a given value, one of the two or more, which makes the corresponding value representative of the change state be the smallest, may be determined as the target relative phase.

It is noted that, when the total-braking-force change characteristic is obtained, the target relative phase in association with the actual relative phase may be predetermined and stored.

(14) The brake system according to any one of modes (1)-(13), wherein the rotational-angle control device includes a target-relative-phase-determining-table storing portion configured to store the target relative phase and an actual relative phase between the corresponding two of the at least two wheels, such that the stored target relative phase and actual relative phase are associated with each other.

A target-relative-phase determining table may be stored either in place of or in addition to the change characteristic.

(15) The brake system according to any one of modes (1)-(14), wherein the relative-phase obtaining device includes an obtaining portion configured to obtain the relative phase, based on a value that is obtained by subtracting a rotational angle of a second wheel as one of the corresponding two of the at least two wheels from a rotational angle of a first wheel as another of the corresponding two of the at least two wheels, and wherein the rotational-angle control device includes at least one of (a) a second-wheel-rotation restriction controlling portion that is configured to restrict a rotation of the second wheel relative to a rotation of the first wheel when the relative phase is smaller than the target relative phase, and (b) a first-wheel-rotation restriction controlling portion that is configured to restrict the rotation of the first wheel relative to the rotation of the second wheel when the relative phase is larger than the target relative phase.

(16) The brake system according to any one of modes (1)-(15), wherein the relative-phase obtaining device includes an obtaining portion configured to obtain the relative phase, based on a value that is obtained by subtracting a rotational angle of a second wheel as one of the corresponding two of the at least two wheels from a rotational angle of a first wheel as another of the corresponding two of the at least two wheels, and wherein the rotational-angle control device includes at least one of (a) a first-wheel-rotation promotion controlling portion that is configured to promote a rotation of the first wheel relative to a rotation of the second wheel when the relative phase is smaller than the target relative phase, and (b) a second-wheel-rotation promotion controlling portion that is configured to promote the rotation of the second wheel relative to the rotation of the first wheel when the relative phase is larger than the target relative phase.

When the relative phase is smaller than the target relative phase, the relative phase is increased. By increasing the rotational velocity of the first wheel relative to the rotational velocity of the second wheel, or by reducing the rotational velocity of the second wheel relative to the rotational velocity of the first wheel, the relative phase can be increased to become close to the target relative phase.

When the relative phase is larger than the target relative phase, the relative phase is reduced. By reducing the rotational velocity of the first wheel relative to the rotational velocity of the second wheel, or by increasing the rotational velocity of the second wheel relative to the rotational velocity of the first wheel, the relative phase can be reduced to become close to the target relative phase.

For reducing the rotational velocity, it is possible to apply a braking force to the wheel or increase the braking force already applied to the wheel. In other words, the rotational velocity of one of the corresponding two wheels may be reduced relative to the rotation velocity of the other of the corresponding two wheels, either before or during working of the friction brake or regenerative brake.

For increasing the rotational velocity, it is possible to apply a driving force to the wheel or increase the driving force already applied to the wheel.

Where each of the first and second wheels is a drive wheel incorporating therein a wheel-in motor, the driving force and/or regenerative braking force applied to each of the first and second wheels can be controlled by controlling the corresponding wheel-in motor, such that the driving force and/or regenerative braking force applied to one of the first and second wheels and the driving force and/or regenerative braking force applied to the other of the first and second wheels are controlled independently of each other.

(17) The brake system according to any one of modes (1)-(16), wherein the relative-phase obtaining device includes an obtaining portion configured to obtain the relative phase, based on a value that is obtained by subtracting a rotational angle of a second wheel as one of the plurality of wheels from a rotational angle of a first wheel as another of the plurality of wheels, wherein the rotational-angle control device includes a friction-braking-force controlling portion configured to control a rotational velocity of the at least one of the at least two wheels, by controlling the braking force of at least one of the friction brakes that is provided for the at least one of the at least two wheels, and wherein the friction-braking-force controlling portion includes a braking-force-change-rate controlling portion configured to cause the relative phase to become close to the target relative phase, by relatively changing a rate of change of the braking force of the at least one of the friction brakes that is provided for the at least one of the at least two wheels.

By the braking-force-change-rate controlling portion, a rate of increase of the braking force is restricted or a rate of reduction of the braking force is increased. Thus, the rate of the increase or reduction of the braking force applied to one of the at least two wheels and the rate of the increase or reduction of the braking force applied to the other of the at least two wheels can be controlled relative to each other, whereby the relative phase between the two wheels can be controlled.

(18) The brake system according to mode (17), wherein the braking-force-change-rate controlling portion includes (a) a first-wheel-braking-force-increase-rate restriction controlling portion that is configured, when the relative phase is smaller than the target relative phase, to cause a rate of increase of the braking force applied to the first wheel, to become smaller than a rate of increase of the braking force applied to the second wheel, and (b) a second-wheel-braking-force-increase-rate restriction controlling portion that is configured, when the relative phase is larger than the target relative phase, to cause a rate of increase of the braking force applied to the second wheel, to become smaller than a rate of increase of the braking force applied to the first wheel.

By making the rate of change of the braking force applied to the first wheel and the rate of change of the braking force applied to the second wheel different from each other, it is possible to change the relative phase between the first and second wheels and accordingly to cause the relative phase to become close to the target relative phase.

Where the friction brakes works for a plurality of wheels of the vehicle, it is preferable that the rotational angle is controlled at a beginning of activation of each friction brake. Thus, it is preferable that the rate of increase of the braking force is controlled.

It is noted that a rate of change of the driving force may be controlled as well as the rate of change of the braking force.

(19) The brake system according to any one of modes (1)-(18), wherein the rotational-angle control device includes at least one of (a) a non-working-state controlling portion that is configured to control the rotational angle of the at least one of the at least two wheels, when each of the friction brakes provided for the at least two wheels is not in a working state, and (b) a working-state controlling portion that is configured to control the rotational angle of the at least one of the at least two wheels, when each of the friction brakes provided for the at least two wheels is in the working state.

The relative phase may be controlled either while each of the friction brake is in the non-working state or while each of the friction brakes is in the working state.

For example, in an arrangement in which the relative phase is controlled while each friction brake is in the non-working state, it is possible to satisfactorily suppress the control hunting that would be caused when the friction brake is placed in the working state.

(20) The brake system according to mode (19), wherein the rotational-angle control device includes the non-working-state controlling portion, and wherein the non-working-state controlling portion includes a pre-activation controlling portion that is configured to control the rotational angle of the at least one of the at least two wheels when there is a possibility that the friction brakes provided for the at least two wheels are to be activated.

It is preferable that the relative phase is controlled while each friction brake is in the non-working state. However, there is a risk that the control of the rotational angle could be wasted, for example, if the relative phase is changed as a result of turning of the vehicle after the relative phase has been caused to become close to the target relative phase.

However, in an arrangement in which the relative phase is controlled when there is a high possibility that the friction brakes are to be activated, it is possible to increase a probability that the relative phase is close to the target relative phase upon initiation of activation of the friction brakes, so that the control hunting can be satisfactorily suppressed during working of the friction brakes.

(21) The brake system according to mode (20), wherein the pre-activation controlling portion includes a regenerative-braking-situation controlling portion that is configured to control the rotational angle of the at least one of the at least two wheels, when a regenerative braking force is being applied to each of at least one drive wheel of the vehicle without the braking forces of the friction brakes provided for the at least two wheels being applied to the at least two wheels.

(22) The brake system according to mode (21), comprising:

(a) a brake operating member operable by an operator of the vehicle; and (b) a regenerative cooperative control device configured to control a friction braking force applied, by each of the friction brakes provided for the plurality of wheels, to the plurality of wheels and/or a regenerative braking force applied to each of at least one drive wheel that is at least one of the plurality of wheels, such that an overall braking force including the friction braking force and the regenerative braking force becomes close to a required braking force that is determined depending on an operational state of the brake operating member, wherein the pre-activation controlling portion includes a regenerative-braking-situation controlling portion that is configured to control the rotational angle of the at least one of the at least two wheels when the brake operating member is operated in a state in which execution of control by the regenerative cooperative control device is allowed.

It is common that the execution of control by the regenerative cooperative control device is allowed when the brake system is normal.

(23) The brake system according to mode (21) or (22), wherein the regenerative-braking-situation controlling portion includes a low-velocity-braking-situation controlling portion that is configured to control the rotational angle of the at least one of the at least two wheels, when a running velocity of the vehicle is not higher than a given velocity and an operating velocity of a brake operating member operable by an operator of the vehicle is not higher than a given velocity.

In a regenerative cooperative control, the friction braking force is made zero in a case when the required braking force, which is determined depending on the operational state of the brake operating member, can be realized by an outputtable regenerative braking force, but the friction braking force is added in a case when the required braking force cannot be realized by only the regenerative braking force. Thus, it is often that the required braking force is satisfied by the regenerative braking force (without the friction braking force) at an initial stage of operation of the brake operating member and that the friction braking force is applied after the initial stage of operation of the brake operating member.

In view of the above-described circumstances, it is considered that the control hunting can be satisfactorily suppressed when the friction brake is actually activated, in an arrangement in which the relative phase is controlled while the regenerative braking force is applied without application of the friction braking force.

Thus, the activation of the friction brake is initiated after operation of the brake operating member, so that the rotational angle can be controlled when the operation of the brake operating member is detected (for example, when a brake switch is switched from OFF to ON after a trigger event that is the detection of the operating of the brake).

It is noted that each of the at least one drive wheel and each of the at least two wheels may be constituted by either a same wheel or respective wheels that are other than each other.

On the other hand, when the regenerative cooperative control is executed during running of the vehicle at a middle or high running velocity, the regenerative braking force could be limited due to condition of a storage device. Therefore, there are many cases where the required braking force cannot be satisfied by the regenerative braking force so that the friction braking force is applied from an initial stage of the regenerative cooperative control.

However, where the regenerative cooperative control is executed in response to operation of the brake operating member during running of the vehicle at a low running velocity, it is not common that the regenerative braking force is limited in the initial stage of the regenerative cooperative control, so that the required braking force is likely to be satisfied by the regenerative braking force.

In view of the above-described circumstances, it is considered that the rotational angle can be controlled at the initial stage of the regenerative cooperative control, where the regenerative cooperative control is executed in response to operation of the brake operating member during running of the vehicle at a low running velocity.

On the other hand, when the braking operating member is operated at a high operating velocity during running of the vehicle at a low running velocity, the vehicle is rapidly stopped so that there is not a high need for execution of control of the rotational angle.

Therefore, it is preferable that the control of the rotational angle is executed when the brake operating member is operated in a non-abrupt manner (with the operating velocity being not higher than a given velocity and with the operating force being not lager than a given magnitude) during running of the vehicle at a low running velocity.

(24) The brake system according to any one of modes (20)-(23), wherein the pre-activation controlling portion includes an acceleration-releasing-situation controlling portion that is configured to control the rotational angle of the at least one of the at least two wheels, (a) when an operation of an acceleration operating member provided in the vehicle is released and/or (b) when a releasing operation by which the operation of the acceleration operating member is released is made at a velocity that is not lower than a given velocity.

When the operation of the acceleration operating member is released, it can be anticipated that the activation of the friction brake is initiated in the near future and it can be considered that a probability of initiation of the activation of the friction brake is high.

An operational state of the acceleration operating member is detectable by an acceleration opening-degree sensor. It is considered that a possibility of initiation of the activation of the friction brake is high, when the detected value detected by the acceleration opening-degree sensor is reduced from a value larger than a given opening degree (that may be 0 degree) to a value not larger than the given opening degree, or when a rate of reduction of the detected value detected by the acceleration opening-degree sensor is not lower than a given rate. The feature described in this mode is applicable also to a brake system in which a regenerative cooperative control is not executed.

It is common that the rotational angle control is initiated when the acceleration opening degree becomes not larger than a given opening degree (that may be 0 degree). However, the rotational angle control may be initiated even before the acceleration opening degree becomes not larger than the given opening degree, in a case when the velocity of the releasing operation by which the operation of the acceleration operating member is released is not lower than a given velocity.

(25) The brake system according to any one of modes (20)-(24), wherein the pre-activation controlling portion includes an acceleration-releasing-situation controlling portion that is configured to control the rotational angle of the at least one of the at least two wheels, when an acceleration operating member provided in the vehicle is released with a running velocity of the vehicle being higher than a given velocity.

When the operation of the acceleration operating member is released during running of the vehicle at a low running velocity, there is a case in which the vehicle operator has an intention of moving the vehicle by using a creep force. In such a case, there is a possibility that the friction brakes are not activated in the new future. On the other hand, when the operation of the acceleration operating member is released during running of the vehicle at a running velocity higher than a given velocity (i.e., during running of the vehicle at a middle or high running velocity), it is often that the vehicle operator has an intention of decelerating the vehicle. Thus, when the operation of the acceleration operating member is released during running of the vehicle at a middle or high running velocity, it is reasonable that the rotational angle is controlled.

Meanwhile, when the brake operating member is operated during running of the vehicle at a middle or high running velocity in a brake system in which the regenerative cooperative control is executable, it is often that the regenerative braking force is limited whereby the required braking force cannot be satisfied by the regenerative braking force so that the friction brakes are activated immediately upon initiation of operation of the brake operating member. Therefore, it is preferable that the rotational angle is controlled before the brake operating member is operated.

(26) The brake system according to any one of modes (19)-(25), comprising:

(a) a brake operating member operable by an operator of the vehicle; and (b) a normal-situation braking-force control device configured to control a braking force of each of the friction brakes provided for the plurality of wheels, such that the braking force is controlled to a magnitude that is determined depending on an operational state of the braking operating member, wherein the rotational-angle control device includes the working-state controlling portion, and wherein the working-state controlling portion includes a normal-braking-situation controlling portion configured to control a rotational velocity of the at least one of the at least two wheels during control executed by the normal-situation braking-force control device.

In an anti-lock control, a traction control and a vehicle-stability control, the rotational velocity of each wheel is controlled. That is, it is not preferable that the relative phase is controlled when a slip control is executed. Further, when the slip control is executed, it is often that the vehicle operator and passengers are not so sensitive to noise generated due to the control hunting.

Therefore, it is preferable that the rotational angle is controlled during a normal braking, and that the control of the rotational angle is executed at an initial stage of the braking operation.

(27) The brake system according to any one of modes (1)-(26), wherein the rotational-angle control device includes a phase-difference-holding-situation controlling portion that is configured to control a rotational angle of the at least one of the at least two wheels in a state in which the relative phase between the corresponding two of the at least two wheels is kept constant in an assumed case when a rotational angle control is not executed by the rotational-angle control device.

The rotational angle control is executed in the state in which the relative phase is changed by the rotational angle control but not changed by any other factor other than the rotational angle control.

It is preferable that the rotational angle control is executed in (a) a state in which the rotational velocities of the corresponding two wheels are constant and are substantially equal to each other in an assumed case when the rotational angle control is not executed, (b) a state in which the corresponding two wheels are running straight on a rod surface that is other than a gravel road and a straddle road, or (c) in a state in which the driving force and the braking force are not being applied to either of the corresponding two wheels, or in a state in which the driving or braking force applied to one of the corresponding two wheels and the driving or braking force applied to the other of the corresponding two wheels are the same in magnitude.

(28) The brake system according to any one of modes (1)-(27), wherein the rotational-angle control device includes an in-rotation controlling portion that is configured to control the rotational angle of the at least one of the at least two wheels during rotation of the at least one of the corresponding two of the at least two wheels.

The relative phase is controlled, for example, during running of the vehicle.

(29) The brake system according to any one of modes (1)-(28), comprising a yaw-moment suppression device configured to control at least one of a steering apparatus, a braking apparatus and a driving apparatus of the vehicle such that an absolute value of a yaw moment, which is caused by execution of control by the rotational-angle control device to act on the vehicle, becomes smaller than a given value.

For example, when the rotational-angle control device causes a force to be applied to a controlled wheel or wheels (that are subjected to the rotational angle control) in a longitudinal direction of the vehicle, there is a risk that a yaw moment would be generated in the vehicle as a result of application of the force applied to the controlled wheel or wheels. In such a case, the yaw moment can be suppressed by controlling the steering apparatus, braking apparatus and/or driving apparatus of the vehicle.

(30) The brake system according to mode (29),
wherein the at least two wheels consist of left and right wheels that are a pair of front wheels or a pair of rear wheels of the vehicle,
wherein the rotational-angle control device includes a friction-braking-force controlling portion configured to control a rotational angle of one of the left and right wheels, by controlling a braking force of one of the friction brakes that is provided for the one of the left and right wheels, and
wherein the yaw-moment suppression device includes a braking-force-control-based yaw-moment suppressing portion configured to suppress the yaw moment acting on the vehicle, by controlling the braking force of one of the friction brakes provided for one of the plurality of wheels that is located in a position diagonal to the one of the left and right wheels.

The yaw moment can be suppressed, for example, by controlling the braking force applied to the wheel located in the position diagonal to the controlled wheel (that is subjected to the rotational angle control), in the same manner as control of the braking force applied to the controlled wheel (that is subjected to the rotational angle control).

(31) The brake system according to any one of modes (1)-(30), wherein the rotational-angle control device includes a friction-braking-force controlling portion configured to cause the relative phase to become close to the target relative phase, by controlling the braking force of at least one of the friction brakes that is provided for the at least one of the at least two wheels.

(32) The brake system according to any one of modes (1)-(31),
wherein the at least two wheels consist of left and right wheels that are a pair of front wheels or a pair of rear wheels of the vehicle,
wherein the friction brakes provided for the left and right wheels constitute service brakes,
the brake system comprising parking brakes which are provided for the left and right wheels and which are activatable independently by respective electric actuators,
wherein the friction-braking-force controlling portion includes a parking-braking-force controlling portion configured to independently control at least one of the electric actuators that is provided for at least one of the left and right wheels so as to control the braking force of a corresponding at least one of the parking brakes that is to be activated by the at least one of the electric actuators.

For example, where the service brake and parking brake are both provided for each one of the left and right wheels, the parking brake provided for one of the left and right wheels may be activated so as to restrict the rotation of the one of the left and right wheels relative to the rotation of the other of the left and right wheels, for thereby making it possible to cause the relative phase to become close to the target relative phase. The parking brake may be controlled either during working or non-working of the service brake. By utilizing the parking brake, the relative phase can be caused to become close to the target relative phase, during control of the service brake, irrespective of the control of the service brake.

(33) The brake system according to any one of modes (1)-(32),
wherein the at least two wheels consist of two drive wheels of the vehicle,
wherein the vehicle include wheel-in motors provided for driving the respective two drive wheels,
and wherein the rotational-angle control device includes a motor controlling portion configured to control the rotational angle of at least one of the two drive wheels, by controlling a corresponding at least one of the wheel-in motors that is provided for the at least one of the two drive wheels.

By controlling the wheel-in motor, it is possible to control the regenerative braking force or control the driving force, so that the relative phase can be controlled by controlling the force that is applied to the wheel in the longitudinal direction of the vehicle.

It is noted that the technical features described in any one of the other modes can be employed in the brake system described in this mode. In other words, the feature of control of the braking force of the friction brake can be utilized in control of the regenerative braking force.

(34) The brake system according to any one of modes (1)-(33),
wherein the at least two wheels consist of left and right wheels that are a pair of front wheels or a pair of rear wheels of the vehicle, and
wherein the friction brakes provided for the left and right wheels are drum brakes.

The braking force of the drum brake is easily changeable periodically as the wheel is rotated.

(35) The brake system according to any one of modes (1)-(34), wherein the relative-phase obtaining device includes (a) a rotational-angle detecting device configured to detect the rotational angle of each of the corresponding two of the at least two wheels, the corresponding two including first and second wheels and (b) a relative-phase calculating portion configured to calculate the relative phase, such that, when a subtracted value obtained by subtracting the rotational angle of the second wheel from the rotational angle of the first wheel is a positive value, the calculated relative phase corresponds to the subtracted value, and such that, when the subtracted value is a negative value, the calculated relative phase corresponds to a value obtained by subtracting an absolute value of the subtracted value from a value corresponding to $2\pi$.

The rotational-angle detecting device is configured to detect an amount of an angular displacement of the wheel from a reference angular position to a current angular position. Actually, in most cases, the amount of the angular displacement is obtained by using a rotational-velocity detecting device. Where the rotational-velocity detecting device is configured to detect the rotational velocity based on a number of pulse signals that are outputted (as a result of rotation of the wheels) per a unit time, the rotational angle can be obtained based on a number of the pulse signals as counted from the reference angular position. In this case, since an angular interval between each successive two of the pulse signals is known, the rotational angle can be represented by the number of the pulse signals.

Further, the relative phase can be represented by a difference between the rotational angles of the two wheels, and can be represented by a number of the pulse signals. Similarly, the value corresponding to $2\pi$ can be represented by a number of the pulse signals outputted during one rotation of the wheels.

The rotational-angle detecting device may either be or not be of absolute-type. Where the rotational-angle detecting device is of absolute-type, the reference angular position is a predetermined fixed position in the device. On the other hand, where the rotational-angle detecting device is not of absolute-type, the reference angular position may be set to an arbitrary position such as an angular position upon initiation of detection of the rotational angle.

(36) The brake system according to any one of modes (1)-(35), wherein the vehicle includes a driving apparatus having at least one driving electric motor, wherein two of the plurality of wheels consist of drive wheels that are connected to the at least one driving electric motor, the brake system comprising a regenerative cooperative control device configured to control the braking forces applied, by the friction brakes provided for the plurality of wheels, to the plurality of wheels, such that an overall braking force including the braking forces applied by the friction brakes and a regenerative braking force applied, by each of the at least one driving electric motor, to a corresponding one of the drive wheels, becomes close to a required braking force that is determined depending on an operational state of the brake operating member operated by an operator of the vehicle.

(37) A brake system comprising:

friction brakes provided for at least two wheels that are at least two of a plurality of wheels of a vehicle;

a relative-phase obtaining device configured to obtain at least one relative phase each of which is a relative phase between corresponding two of the at least two wheels; and a change-characteristic obtaining device configured to obtain a total-braking-force change characteristic that is a relationship between the relative phase obtained by the relative-phase obtaining device and a value representative of state of change of a total braking force during at least one rotation of the at least two wheels, the total braking force including braking forces of the friction brakes provided for the at least two wheels.

The technical features described in any one of modes (1)-(36) can be employed in the brake system described in this mode.

The obtained total-braking-force change characteristic can be utilized in various controls.

(38) The brake system according to any one of modes (11)-(37), wherein the change-characteristic obtaining device includes (a) an individual-braking-force detecting device configured to detect the braking forces of the friction brakes provided for the at least two wheels, (b) an individual-braking-force change obtaining portion configured to obtain relationships each of which is between the rotational angle of a corresponding one of the at least two wheels and the braking force of a corresponding one of the friction brakes detected by the individual-braking-force detecting device during at least one rotation of the corresponding one of the at least two wheels, and (c) a composite-type total-braking-force-change-characteristic obtaining portion configured to obtain the relationship between the relative phase and the value representative of state of change of the total braking force, based on changes of the braking forces of the friction brakes which are obtained by the individual-braking-force change obtaining portion.

The relationships, each of which is between the rotational angle of the corresponding wheel and the braking force applied to the corresponding wheel, are obtained, and are composed with each other whereby the relationship between each of the at least one relative phase and the total braking force can be obtained.

The individual-braking-force detecting device may be provided for each individual one of the plurality of wheels or may be provided commonly for the plurality of wheels. Where the individual-braking-force detecting device is provided commonly for the plurality of wheels, the device may include a detecting portion to which brake cylinders are selectively connected.

(39) A brake system comprising:

friction brakes provided for at least two wheels that are at least two of a plurality of wheels of a vehicle;

a relative-phase obtaining device configured to obtain at least one relative phase each of which is a relative phase between corresponding two of the at least two wheels; and a relative-phase control device configured to control the relative phase obtained by the relative-phase obtaining device such that the relative phase is controlled to a value that causes a value representative of state of change of a total braking force to become smaller than a given value, the total braking force including braking forces of the friction brakes provided for the at least two wheels.

In the brake system described in this mode, each of the at least one relative phase is controlled. More specifically, each of the at least one relative phase is controlled to the value that reduces the value representative of state of change of the total braking force, for example, by controlling a rotational angle of at least one of the corresponding two of the at least two wheels.

The technical features described in any one of modes (1)-(38) can be employed in the brake system described in this mode.

(40) A brake system comprising:

friction brakes provided for a plurality of wheels of a vehicle;

a relative-phase obtaining device configured to obtain a relative phase between two wheels that are two of the plurality of wheels, a change-characteristic obtaining device configured to obtain a change characteristic that is a relationship between the relative phase obtained by the relative-phase obtaining device and a value representative of state of change of a total braking force during at least one rotation of the two wheels, the total braking force including braking forces of the friction brakes provided for the two wheels; and a rotational-angle control device configured to cause the relative phase to become close to a target relative phase by controlling a rotational angle of at least one of the two wheels, the target relative phase being determined based on the change characteristic obtained by the change-characteristic obtaining device.

The technical features described in any one of modes (1)-(39) can be employed in the brake system described in this mode.

MODES FOR CARRYING OUT THE INVENTION

Hereinafter, a brake system as an embodiment of the present invention will be described with reference to drawings.

Embodiment 1

There will be first described a vehicle on which a hydraulic brake system as a brake system according to the present embodiment is installed.

<Vehicle>

Figure 1:
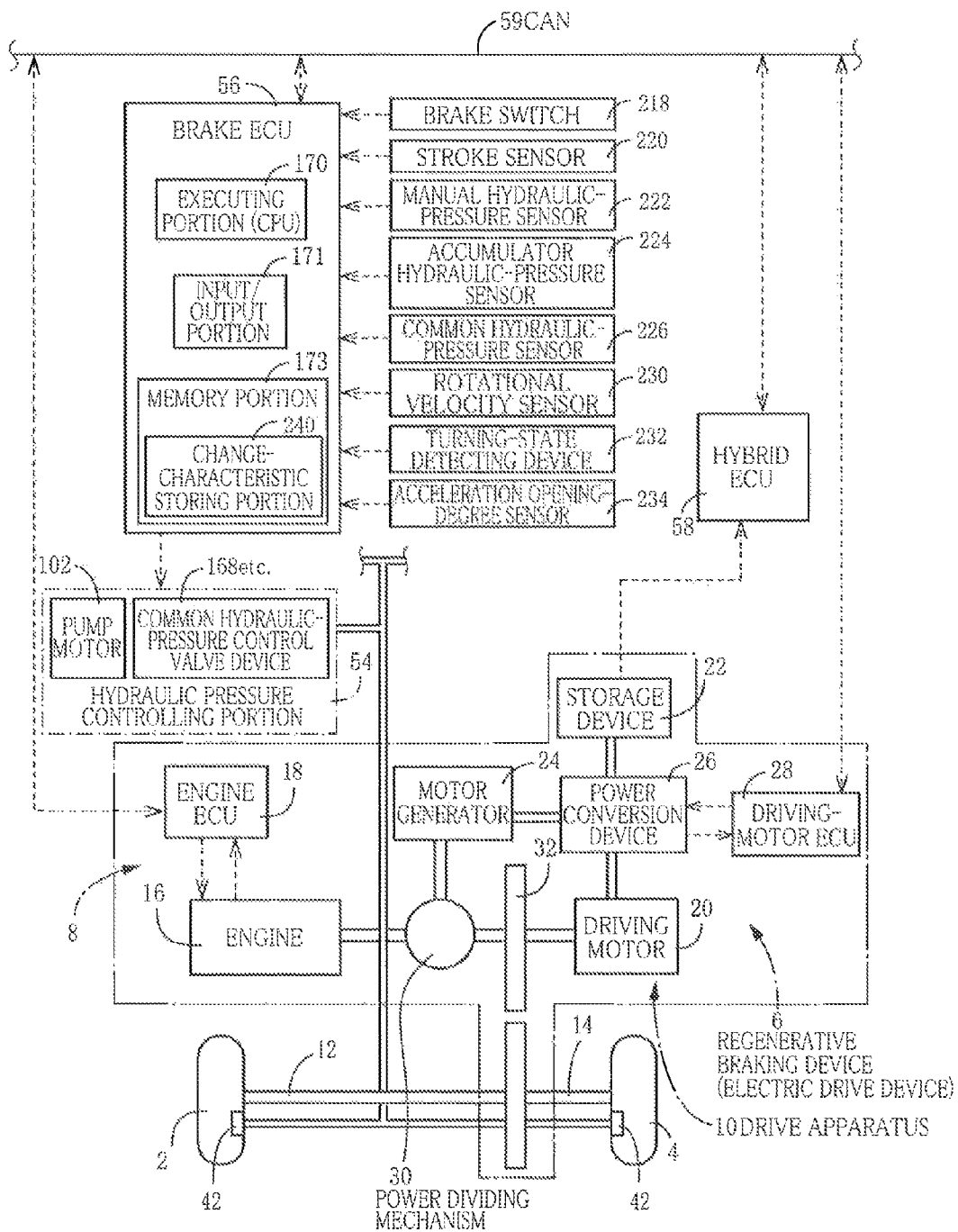
FIG. 1 is a view showing an entirety of a vehicle in which a brake system according to an embodiment (Embodiment 1) of the present invention is installed.

As shown in FIG. 1, this vehicle is a hybrid vehicle having a drive device that includes an electric motor and an engine, so that front left and right wheels 2, 4 as drive wheels are to be driven by a drive apparatus 10 including an electric drive device 6 and an internal-combustion drive device 8. A drive power of the drive apparatus 10 is transmitted to the front left and right wheels 2, 4 via drive shafts 12, 14. The internal-combustion drive device 8 includes an engine 16 and an engine ECU 18 that is configured to control activation of the engine 16. The electric drive device 6 includes an electrically driving motor (electric motor) 20, a storage device 22, a motor generator 24, a power conversion device 26 and a motor ECU (driving-motor ECU) 28.

The electric motor 20, motor generator 24 and engine 16 are connected to one another via a power dividing mechanism 30. The electric motor 20, motor generator 24, engine 16 and power dividing mechanism 30 are controlled so as to selectively establish a state in which only a driving torque of the electric motor 20 is transmitted to an output member 32, a state in which a driving torque of the engine 16 and the driving torque of the electric motor 20 are both transmitted to the output member 32, and a state in which an output of the engine 16 is outputted to the motor generator 24 and the output member 32. The driving force transmitted to the output member 32 is transmitted to the drive shafts 12, 14 via a speed reducer and differential gears.

The power conversion device 26 includes an inverter, and is controlled by the motor ECU 28. With an electric current control performed for the inverter, the power conversion device 26 selectively establishes at least a rotary driving state in which the electric motor 20 is rotated by an electric energy supplied from the storage device 22 to the driving motor 20 and a charging state in which the power conversion device 26 serves as a generator upon regenerative braking so as to charge the storage device 22 with an electric energy. During the charging state, a regenerative braking torque is applied to each of the front left and right wheels 4, 2. In this sense, the electric drive device 6 can be considered as a regenerative braking device.

The storage device 22 may be constituted by, for example, a device including a nickel hydride battery or a device including a lithium ion battery.

Figure 2:
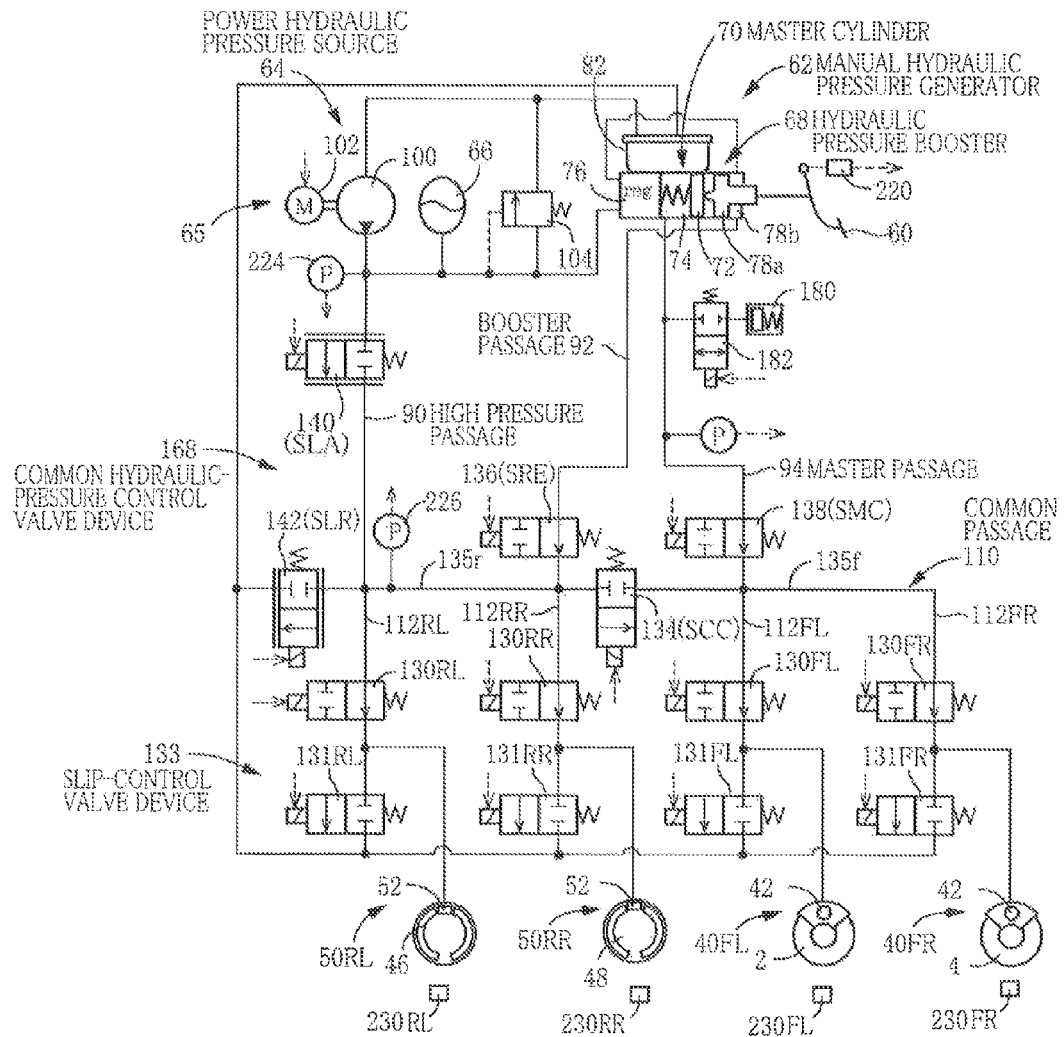
FIG. 2 is a circuit diagram showing a brake hydraulic pressure circuit of the above-described brake system.

The hydraulic brake system includes: brake cylinders 42 of respective hydraulic brakes 40 provided for the respective front left and right wheels 2, 4; brake cylinders 52 of respective hydraulic brakes 50 provided for the respective rear left and right wheels 46, 48 (see FIG. 2); and a hydraulic-pressure controlling portion 54 configured to control hydraulic pressures of the respective brake cylinders 42, 52. The hydraulic-pressure controlling portion 54 is controlled by a brake ECU 56 that is constituted mainly by a computer.

Further, the vehicle is provided with a hybrid ECU 58. The hybrid ECU 58, brake ECU 56, engine ECU 18 and motor ECU 28 are connected to one another via CAN (car area network) 59, so that these ECUs 58, 56, 18, 28 are communicable to one another, and required information are transmitted among the ECUs 58, 56, 18, 28 as needed.

It is noted that constructions of the drive apparatus and drive transmission apparatus of the vehicle, on which the present hydraulic brake system is to be installed, are not limited to those illustrated in FIG. 1. The present hydraulic brake system is applicable also to a vehicle equipped with a drive apparatus and a drive transmission apparatus having constructions that are different from the illustrated constructions.

Further, the present hydraulic brake system is installable also on an ordinary hybrid vehicle (i.e., hybrid vehicle other than a plug-in hybrid vehicle), a plug-in hybrid vehicle, an electric vehicle, a fuel battery vehicle and the like. In an electric vehicle, the internal-combustion drive device 8 is not required. In a fuel battery vehicle, the driving motor is driven by, for example, a fuel battery stack or the like.

Further, the present hydraulic brake system is installable also on an internal-combustion drive vehicle. In such a vehicle not equipped with the electric drive device 6, a regenerative braking torque is not applied to the driving wheels 2, 4 so that a regenerative cooperative control is not executed. For example, the hydraulic pressure of each of the brake cylinders 42 provided for the drive wheels 2, 4 can be controlled to a magnitude that can establish a vehicle running deceleration required by a vehicle operator.

<Brake Circuit>

The hydraulic brake system includes a brake circuit as shown in FIG. 2A.

In the following description of the brake circuit, each of the brake cylinders, hydraulic brakes and below-described various electromagnetic valves will be referred together with, as a suffix, one of reference signs (FR, FL, RR, RL) indicative of the respective front right, front left, rear right and rear left wheels, where it should be clarified which one of the four wheels the referred brake cylinder, hydraulic brake or electromagnetic valve corresponds to. However, each of the brake cylinders, hydraulic brakes and electromagnetic valves will be referred without such reference signs, where it is referred to as a representative of those provided for the four wheels, or where the above-described clarification is not required.

Reference sign "60" denotes a brake pedal as a brake operating member, reference sign "62" denotes a manual hydraulic pressure source which is configured to generate a hydraulic pressure by operation of the brake pedal 60, and reference sign "64" denotes a power hydraulic pressure source including a pump device 65 and an accumulator 66.

a) Hydraulic Pressure Source

The manual hydraulic pressure generator 62 is a hydrobooster-equipped master cylinder including a hydraulic pressure booster 68 and a master cylinder 70.

The master cylinder 70 includes a pressurizing piston 72 that is linked to the brake pedal 60, and is configured to generate a hydraulic pressure in a pressurizing chamber 74 located on a front side of the pressurizing piston 72, owing to an operation of the brake pedal 60.

The hydraulic pressure booster 68 includes (a) a regulator 76 (reg), (b) a power piston 78a which is linked to the brake pedal 60 and the pressurizing piston 72 and (c) a booster chamber 78b disposed on a rear side of the power piston 78a.

The regulator 76 includes a spool (i.e., movable member) and a regulator chamber that are not shown in the drawings. By movement of the spool that is caused by movement of the pressurizing piston 72, the power hydraulic pressure source 64 and a reservoir (i.e., master reservoir) 82 are selectively brought into communication with the regulator chamber, such that the hydraulic pressure of the regulator chamber is adjusted to a magnitude which is determined depending on the brake operating force (and which is higher than a magnitude corresponding to the brake operating force). The hydraulic pressure of the regulator chamber is supplied to the booster chamber 78b whereby a force is applied to the power piston 78a so as to force the power piston 78 in a forward direction so that the brake operating force is assisted.

In the power hydraulic pressure source 64, the pump device 65 includes a pump 100 and a pump motor 102, so that a working fluid is pumped from the reservoir 82 by activation of the pump 100, and the pumped working fluid is accumulated in the accumulator 66. The pump motor 102 is controlled such that the pressure of the working fluid accumulated in the accumulator 66 is held within a predetermined range. Further, owing to a relief valve 104, a discharge pressure of the pump 100 is prevented from being excessively increased.

A high pressure passage 90, a booster passage 92 and a master passage 94 are connected to the power hydraulic pressure source 64, the booster chamber 78b of the hydraulic pressure booster 68 and the pressurizing chamber 74 of the master cylinder 70, respectively, whereby the power hydraulic pressure source 64, the booster chamber 78b and the pressurizing chamber 74 are connected to the common passage 110. Further, the brake cylinders 42FL, 42FR provided for the respective front left and right wheels 2, 4 and the brake cylinders 52RL, 52RR provided for the respective rear left and right wheels 46, 48 are connected to the common passage 110 via respective individual passages 112FL, 112FR, 112RL, 112RR.

b) Hydraulic Brakes

Figure 3:
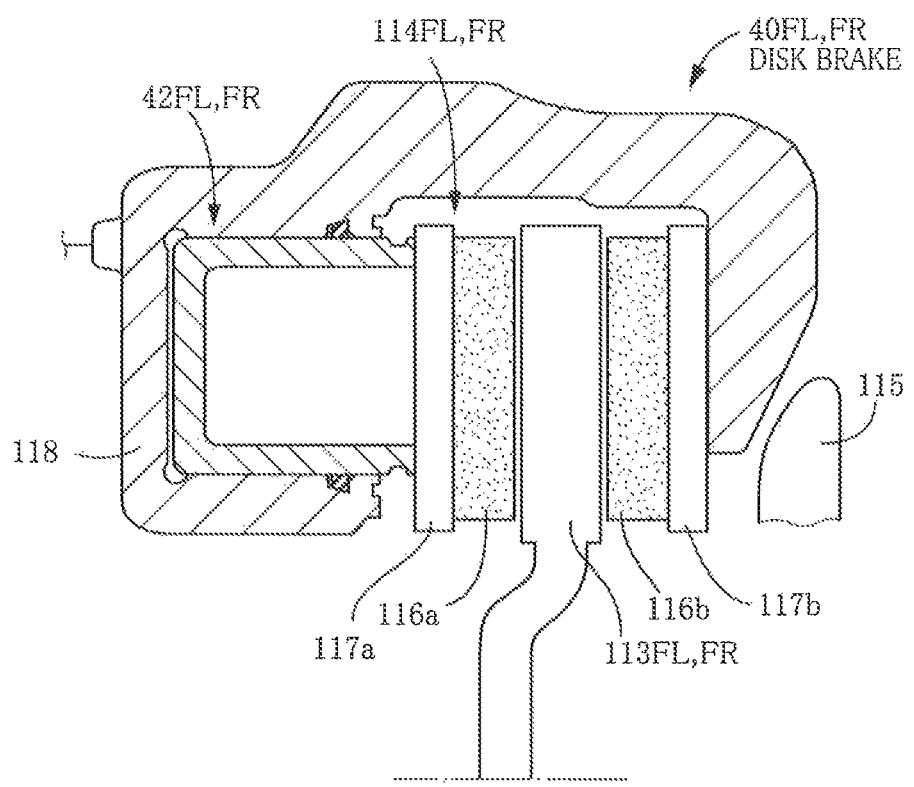
FIG. 3 is a cross sectional view (schematic view) of a disk brake included in the above-described brake hydraulic pressure circuit.

The hydraulic brakes 40FL, 40FR provided for the respective front left and right wheels 2, 4 are disk brakes as shown in FIG. 3.

The disk brakes 40FL, 40FR include rotary disks 113FL, 113FR rotatable integrally with the respective front wheels 2, 4, and pressing devices 114FL, 114FR configured to press frictional engagement members against the respective rotary disks 113FL, 113FR. Each of the pressing devices 114FL, 114FR includes (i) brake pads 116a, 116b and backing plates 117a, 117b as the frictional engagement members and (ii) a caliper 118 as a driving device. The brake pads 116a, 116b and the backing plates 117a, 117b are held by a mounting bracket 115 as a non-rotary body, so as to be opposed to opposite frictional surfaces of a corresponding one of the rotary disks 113FL, 113FR. The caliper 118 is disposed to straddle over the rotary disk 113, and holds the brake cylinder 42.

With supply of the hydraulic pressure to each of the brake cylinders 42, the brake pad 116a is pressed against one of the opposite frictional surfaces of the rotary disk 113, and the caliper 118 is moved in an axial direction relative to the mounting bracket 115 whereby the brake pad 116b is pressed against the other of the opposite frictional surfaces of the rotary disk 113. In this instance, the caliper 118 is elastically deformed, and the brake pads 116a, 116b are elastically deformed. Thus, the disk brake 40 is placed in its activated state whereby rotation of a corresponding one of the front wheels 2, 4 is restrained.

Figure 4:
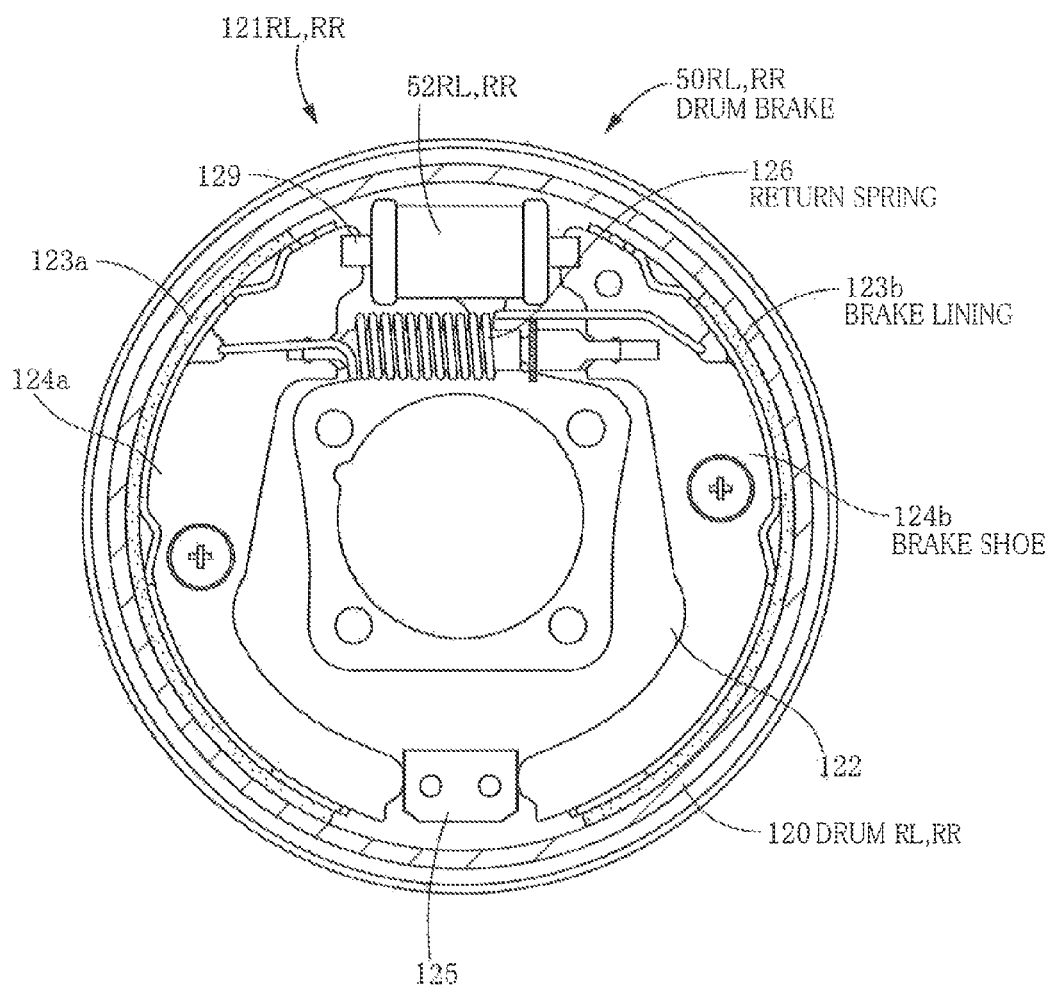
FIG. 4 is a cross sectional view (schematic view) of a drum brake included in the above-described brake hydraulic pressure circuit.

The hydraulic brakes 50RL, 50RR provided for the respective rear left and right wheels 46, 48 are drum brakes as shown in FIG. 4.

The drum brakes 50RL, 50RR include drums 120RL, 120RR rotatable integrally with the respective rear wheels 46, 48, and pressing devices 121RL, 121RR configured to press frictional engagement members against the respective drums 120RL, 120RR. Each of the pressing devices 121RL, 121RR includes (i) a pair of shoes 124a, 124b that are held by a backing plate 122 as a non-rotary body so as to be disposed on an inner peripheral side of a corresponding one of the drums 120RL, 120RR, (ii) the brake cylinder 62 as a driving device that is configured to move the shoes 124a, 124b away from each other so as to spread the shoes 124a, 124b and (iii) an anchor 125 that is fixed to a backing plate 122 as a non-rotary body. The pair of shoes 124a, 124b are provided with respective frictional engagement members 123a, 123b that are disposed on outer peripheral sides of the respective shoes 124a, 124b.

With supply of the hydraulic pressure to a cylinder chamber 128 (see FIG. 6) of each of the brake cylinders 52, a piston 129 is moved forwardly, whereby the pair of shoes 124a, 124b are moved away from each other while being held in contact with the anchor 125. The frictional engagement members 123a, 123b are pressed against an inner circumferential surface of the drum 120 so as to be brought in frictional engagement with the drum 120. Thus, the drum brake 50 is placed in its activated state whereby rotation of a corresponding one of the wheels 46, 48 is restrained.

Each of the drum brakes 50 may be any one of a leading/trailing type drum brake, a duo-servo type drum brake, a uni-servo type drum brake and a two-leading type drum brake.

c) Slip-Control Valve Device

The individual passages 112FL, 112FR, 112RL, 112RR are provided with respective holding valves (SHij: i=F, R; j=L, R) 130FL, 130FR, 130RL, 130RR. Between the brake cylinders 42FL, 42FR, 52RL, 52RR and the reservoir 82, there are disposed pressure reducing valves (SRij: i=F, R; j=L, R) 131FL, 131FR, 131RL, 131RR.

In the present embodiment, each of the pressure holding valves 130 is constituted by a normally-open electromagnetic on-off valve, while each of the pressure reducing valves 131 is constituted by a normally-closed electromagnetic on-off valve. The pressure holding valves 130 and pressure reducing valves 131 are used for a slip control such as an antilock control, a traction control and a vehicle stability control. A slip-control valve device 133 is constituted by, for example, the pressure holding valves 130 (as examples of pressure-increasing individual control valves) and the pressure reducing valves 131 (as examples of pressure-reducing individual control valves).

d) Regarding Periphery of Common Passage

The common passage 110 is provided with a separate valve 134 that is disposed between a front-wheel-side passage portion 135f and a rear-wheel-side passage portion 135r of the common passage 110. The individual passages 112FL, 112FR that are connected to the brake cylinders 42FL, 42FR for the front left and right wheels 2, 4, and the booster passage 92 are connected to the front-wheel-side passage portion 135f. The individual passages 112RL, 112RR that are connected to the brake cylinders 52RL, 52RR for the rear left and right wheels 46, 48, the master passage 94, and the high pressure passage 90 are connected to the rear-wheel-side passage portion 135r.

By selectively opening and closing the separate valve 134, the front-wheel-side passage portion 135f and the rear-wheel-side passage portion 135r are selectively communicated to and isolated from each other. It is noted that the separate valve 134 is constituted by a normally-closed electromagnetic on-off valve.

The booster passage 92, which connects the booster chamber 78b of the hydraulic pressure booster 68 and the common passage 110, is provided with a booster cutoff valve 136. The master passage 94, which connects the pressurizing chamber 74 of the master cylinder 70 and the common passage 110, is provided with a master cutoff valve 138. The high pressure passage 90, which connects the power hydraulic pressure source 64 and the common passage 110, is provided with a common hydraulic-pressure increasing control valve 140. Between the common passage 110 and the reservoir 82, there is provided a common hydraulic-pressure reducing control valve 142.

Each of the booster cutoff valve 136 and the master cutoff valve 138 is constituted by a normally-open electromagnetic on-off valve.

Each of the common hydraulic-pressure increasing control valve 140 and the common hydraulic-pressure reducing control valve 142 is constituted by an electromagnetic linear valve that is capable of continuously controlling a magnitude of the output hydraulic pressure, by continuously controlling an electric current supplied to a coil of a solenoid of the valve.

Figure 5:
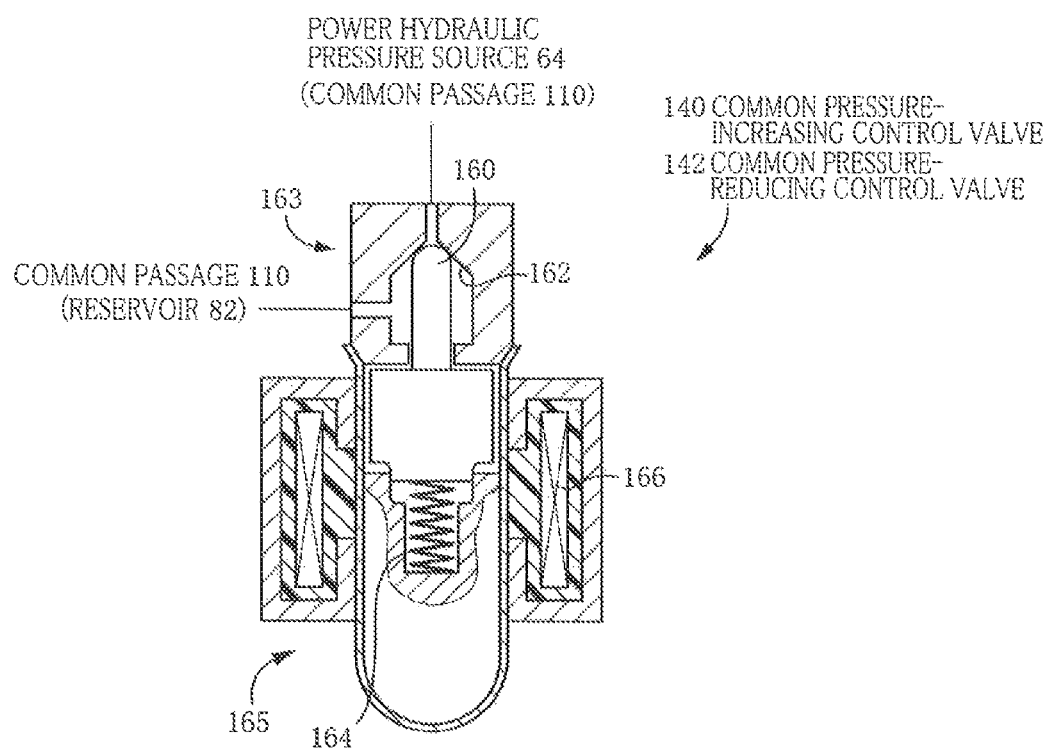
FIG. 5 is a cross sectional view of a common pressure-increasing control valve or a common pressure-reducing control valve included in the above-described brake hydraulic pressure circuit.

As shown in FIG. 5, each of the common hydraulic-pressure increasing control valve 140 and the common hydraulic-pressure reducing control valve 142 includes a seating valve 163, a spring 164 and a solenoid 165. The seating valve 163 has a valve element 160 and a valve seat 162. The spring 164 generates a biasing force F1 forcing the valve element 160 in a direction toward the valve seat 162. The solenoid 165, when an electric current is being supplied to a coil 166 thereof, generates an electromagnetic driving force F2 forcing the valve element 160 in a direction away from the valve seat 162. Further, a pressure-difference-based force F3, which is generated based on a pressure difference between opposite sides of the valve, is caused to act on the valve element 160 in a direction causing the valve element 160 to be separated from the valve seat 162 (F2+F3: F1). Thus, the pressure-difference-based force F3 is controlled by controlling an electric current supplied to the coil 166 of the solenoid 165, whereby the hydraulic pressure of the common passage 110 is controlled.

In the common hydraulic-pressure increasing control valve 140, the pressure-difference-based force F3 is generated based on the pressure difference between the hydraulic pressure of the power hydraulic pressure source 64 and the hydraulic pressure of the common passage 110. In the common hydraulic-pressure reducing control valve 142, the pressure-difference-based force F3 is generated based on the pressure difference (that is equivalent to the hydraulic pressure of the common passage 110) between the hydraulic pressure of the common passage 110 and the hydraulic pressure of the reservoir 82.

A common hydraulic-pressure control valve device 168 is constituted by, for example, the common hydraulic-pressure increasing control valve 140 and the common hydraulic-pressure reducing control valve 142.

e) Stroke Simulator

To the master passage 94, a stroke simulator 180 is connected via a simulator control valve 182 that is constituted by a normally-closed electromagnetic on-off valve.

<Brake ECU>

The hydraulic pressure controlling portion 54 is constituted by, for example, the above-described power hydraulic pressure source 64 (including the pump motor 102), common hydraulic-pressure increasing control valve 140, common hydraulic-pressure reducing control valve 142, booster cutoff valve 136, master cutoff valve 138, pressure holding valves 130 and pressure reducing valves 131. The hydraulic pressure controlling portion 54 is controlled based on command of the brake ECU 56.

The brake ECU 56 is constituted mainly by a computer including an executing portion 170, an input/output portion 171 and a memory portion 173, as shown in FIG. 1. To the input/output portion 171, there are connected, for example, a brake switch 218, a stroke sensor 220, a manual hydraulic-pressure sensor 222, an accumulator hydraulic-pressure sensor 224, a common hydraulic-pressure sensor 226, rotational velocity sensors 230, a turning-state detecting device 232, an acceleration opening-degree sensor 234 and the above-described hydraulic pressure controlling portion 54.

The brake switch 218 is configured to detect whether or not the brake pedal 60 is being in its operated state. For example, the brake switch 218 is in its ON state when the brake pedal 60 is being operated.

The stroke sensor 220 is configured to detect an operating stroke (STK) of the brake pedal 60. In the present embodiment, the stroke sensor 160 is constituted by two sensors for a fail-safe purpose. The two sensors detect the operating stroke (STK1, SKT2) of the brake pedal 60 in substantially the same manner.

The manual hydraulic-pressure sensor 222 is configured to detect the hydraulic pressure corresponding to an operating force that is applied to the brake pedal 60 by the vehicle operator. In the present embodiment, the manual hydraulic-pressure sensor 222 detects the hydraulic pressure of the pressurizing chamber 74 of the master cylinder 70.

The accumulator hydraulic-pressure sensor 224 is configured to detect a pressure (PACC) of the working fluid stored in the accumulator 66.

The common hydraulic-pressure sensor 226 is configured to detect the hydraulic pressure of the common passage 110. When each of the pressure holding valves 130 is in its open state, a corresponding one of the brake cylinders 42, 52 is in communication with the common passage 110, so that the hydraulic pressure of the common passage 110 can be regarded as the hydraulic pressure of the corresponding one of the brake cylinders 42, 52.

Each of the rotational velocity sensors 230 is provided for a corresponding one of the respective front left and right wheels 2, 4 and rear left and right wheels 46, 48, and is configured to detect a rotational velocity of the corresponding wheel. A running velocity of the vehicle is obtained based on the rotational velocities of the four wheels.

The turning-state detecting device 232 includes at least one of a steering angle sensor configured to detect a steering angle of a steering wheel, a yaw rate sensor configured to detect a yaw rate of the vehicle and a lateral acceleration sensor configured to detect a lateral acceleration of the vehicle. Whether or not the vehicle is in a turn can be known based on a value or values detected by the sensor or sensors included in the turning-state detecting device 232.

The acceleration opening-degree sensor 234 is configured to detect an operational state of an acceleration pedal (not shown). The acceleration opening degree is increased with increase of a depressed amount of the acceleration pedal.

The memory portion 173 stores therein various programs and tables, for example. The memory portion 173 includes a change-characteristic storing portion 240 storing therein a change characteristic described below.

<Operations in Hydraulic Brake System>

(A) Regenerative Cooperative Control

In the present hydraulic brake system, a regenerative cooperative control is, in principle, executed during a normal braking.

In the regenerative cooperative control, the hydraulic pressure of the common passage 110 is controlled such that an actual braking force Fs* including an actual regenerative braking force Fm* and an actual hydraulic-pressure braking force Fp* becomes close to a required braking force Fsref required by an operator of the vehicle. The hydraulic pressures of the brake cylinders 42 of the disk brakes 40 and the brake cylinders 52 of the drum brakes 50 are commonly controlled. Specifically, the booster cutoff valve 136 and the master cutoff valve 138 are placed in their closed states, while the separate valve 134 and simulator control valve 182 are placed in their open states. Further, all of the pressure holding valves 130 are placed in their open states while all of the pressure reducing valves 131 are placed in their closed states. With each of these valves being thus placed in its open or closed state, the common pressure-increasing control valve 140 and the common pressure-reducing control valve 142 are controlled whereby the hydraulic pressure of the common passage 110 is controlled and the hydraulic pressures of the brake cylinders 42, 52 are controlled.

Figure 13:
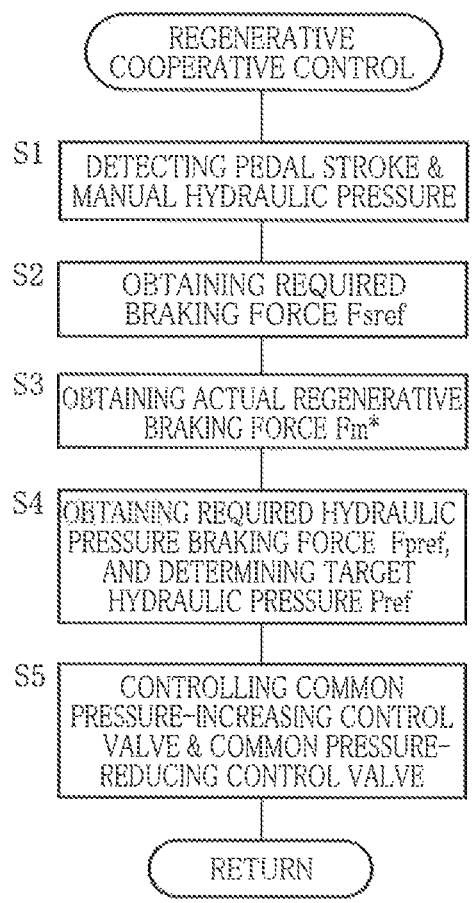
FIG. 13 is a flow chart representing a regenerative cooperative control program stored in the above-described memory portion.

FIG. 13 shows a flow chart representing a regenerative cooperative control program that is executed at a predetermined time interval during the regenerative cooperative control.

In step 1 (hereinafter abbreviated to as "S1" as well as the other steps), an operating stroke of the brake pedal 60 is detected by the stroke sensor 218, and a manual hydraulic pressure corresponding to an operating force applied to the brake pedal 60 is detected by the manual hydraulic-pressure sensor 220. In S2, the required braking force Fsref is obtained based on the operational state of the brake pedal 60, in the brake ECU 56.

Further, in the hybrid ECU 48, an outputtable maximum value of the regenerative braking force is obtained based on, for example, the required braking force Fsref and a condition of the storage device 22, and then a required regenerative braking force Fmref is determined. Then, an inverter is controlled by the motor ECU 28 for obtaining the required regenerative braking force Fmref. Further, the actually obtained regenerative braking force Fm* is detected.

In S3, the brake ECU 56 obtains the actual regenerative braking force Fm* via the CAN 59. In S4, the required hydraulic pressure braking force Fpref is obtained by calculation such that the required braking force Fsref is satisfied by the actual braking force Fs* including the actual regenerative braking force Fm* and the total Fp* that is a sum of the actual hydraulic pressure braking forces for the front left and right wheels 2, 4 and rear left and right wheels 46, 48. Then, the target hydraulic pressure Pref of the common passage 110 is determined. When the required braking force Fsref is satisfied by the actual regenerative braking force Fm, the required hydraulic pressure braking force Fpref is set to zero (0).

In S5, one of a pressure increase mode, a pressure reduction mode and a pressure hold mode is set such that an actual value of the hydraulic pressure (actual hydraulic pressure) Ps of the common passage 110, which is a value detected by the common hydraulic-pressure sensor 226, becomes close to the target hydraulic pressure Pref.

For example, when the actual hydraulic pressure Ps is lower than the target hydraulic pressure Pref by a pressure-increase-side given value or more, the pressure increase mode is set so that the common pressure-increasing control valve 140 is controlled with the common pressure-reducing control valve 142 being placed in its closed state. When the actual hydraulic pressure Ps is higher than the target hydraulic pressure Pref by a pressure-reduction-side given value or more, the pressure reduction mode is set so that the common pressure-reducing control valve 142 is controlled with the common pressure-increasing control valve 140 being placed in its closed state. When the actual hydraulic pressure Ps is neither lower than the target hydraulic pressure Pref by the pressure-increase-side given value or more, nor higher than the target hydraulic pressure Pref by the pressure-reduction-side given value or more, the pressure hold mode is set so that the common pressure-increasing control valve 140 and common pressure-reducing control valve 142 are placed in their closed states. In the pressure hold mode, a region including the brake cylinders 42, 52, individual passages 112 and common passage 110 is made to form a closed region.

(B) Merit and Demerit by Provisions of Drum Brakes

In the present embodiment, the drum brakes 50 are provided for the rear wheels 46, 48.

Since the drum brake 50 is more inexpensive than the disk brake 40, it is possible to reduce a cost of the brake system, by providing the drum brakes 50 for the rear left and right wheels 46, 48.

However, in general, in a case where the drum 120 of the drum brake 50 has a low degree of roundness, or in a case where the drum 120 is attached eccentrically with respect to the backing plate, the hydraulic pressure of the brake cylinder 52 is periodically changed with rotation of the wheel 46 or 48.

Figure 6A:
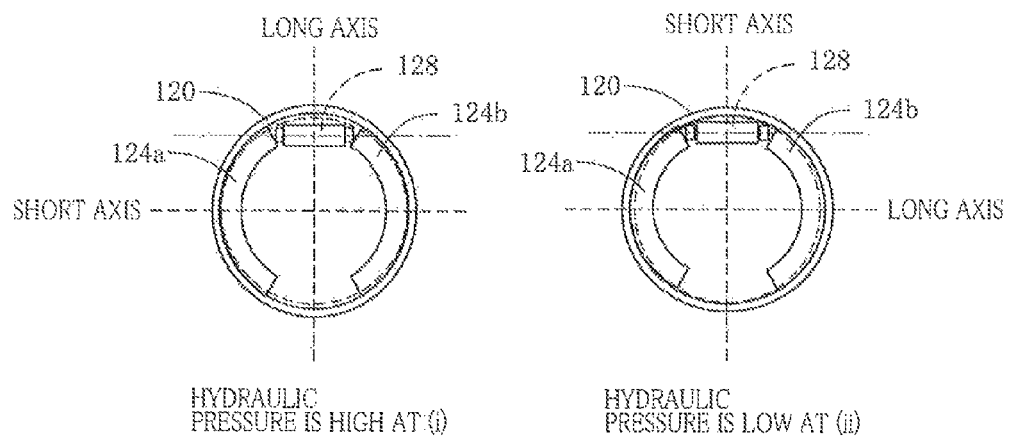
FIG. 6A is a set of views showing activated states of the above-described drum brake, for explaining an object of the present invention.

For example, in a case where the drum 120 has generally an elliptical shape as shown in FIG. 6A, when the pressure hold mode is being set (so that the common pressure-increasing control valve 140 and common pressure-reducing control valve 142 are placed in their closed states) for controlling the hydraulic pressure of the common passage 110, the hydraulic pressure of the cylinder chamber 128 of each brake cylinder 52 is changed since a distance between the pair of brake shoes 124a, 124b and an inner circumferential surface of the drum 120 opposed to the pair of brake shoes 124a, 124b is changed with rotation of the wheel 46 or 48.

Figure 6B:
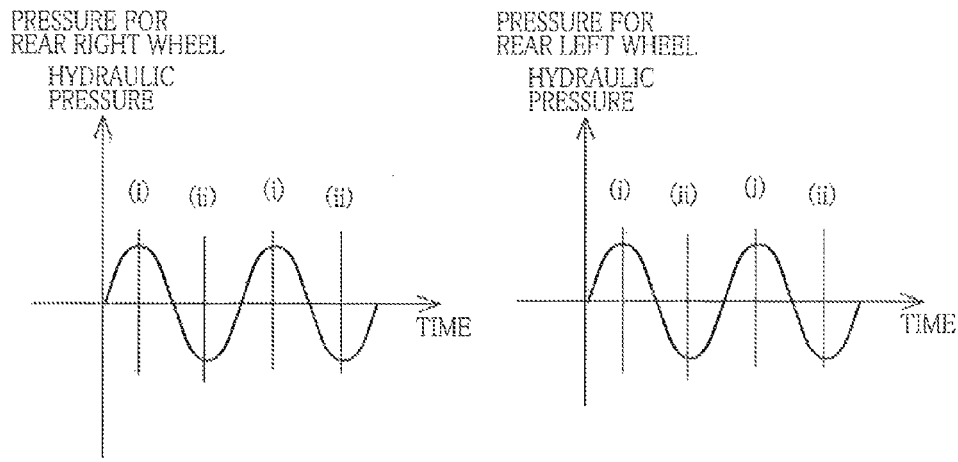
FIG. 6B is a set of views showing pulsation caused in the above-described drum brake, for explaining the object of the present invention.
Figure 6C:
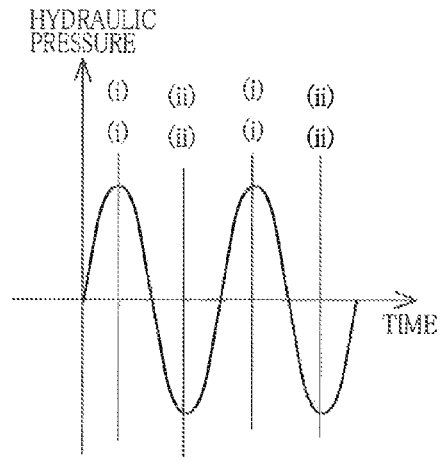
FIG. 6C is a view showing a case where the pulsations of the left and right drum brakes are overlapped with each other, for explaining the object of the present invention.

Further, in the case where the drum 120 has an elliptical shape (without the drum 120 being eccentric with respect to the backing plate), the brake cylinder pressure is changed during one rotation of the drum 120 (i.e., one rotation of the wheel 46 or 48), as shown in FIG. 6B. There are a case when a major portion of an outer circumferential surface (friction engaging member 123a, 123b) of the pair of brake shoes 124a, 124b is opposed to a portion of the drum 120 that corresponds to a long axis of the ellipse and another case when the major portion of the outer circumferential surface of the pair of brake shoes 124a, 124b is opposed to a portion of the drum 120 that corresponds to a short axis of the ellipse. These two cases are alternated every $\pi/2$, so that the hydraulic pressure of the brake cylinder 52 is changed with a cycle corresponding to $\pi$.

When the vibration of the hydraulic pressure of the brake cylinder 52RL for the rear left wheel 46 and the vibration of the hydraulic pressure of the brake cylinder 52RR for the rear right wheel 48 overlap with each other, there is a case where an amplitude of hydraulic pressure (hereinafter referred to as rear-left/right-wheels total hydraulic pressure Ps that is an example of a total hydraulic pressure) is increased whereby a control hunting could be caused in control of the hydraulic pressure of the common passage 110, as shown in FIG. 6O.

Figure 7:
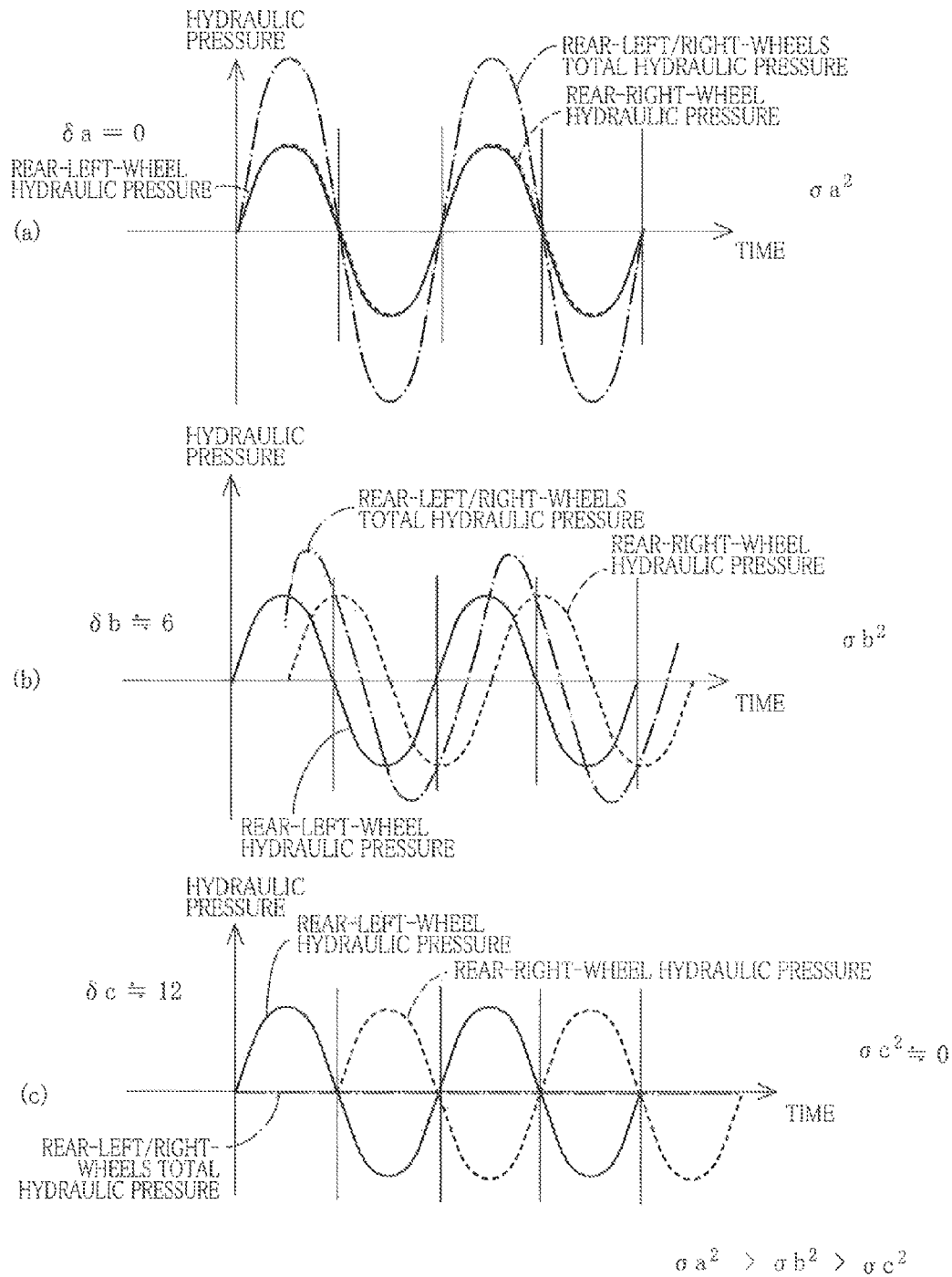
FIG. 7 is a set of views showing change of a sum of hydraulic pressures of the drum brakes provided for the left and right wheels, wherein the view (a) shows the change in a case where a relative phase between the left and right wheels is 0, the view (b) shows the change in a case where the relative phase between the left and right wheels is $\pi/8$, and the view (c) shows the change in a case where the relative phase between the left and right wheels is $\pi/4$.

On the other hand, if a relative phase between the rear left and right wheels 46, 48 is changed, the amplitude of the rear-left/right-wheels total hydraulic pressure Ps is also changed as shown in FIG. 7. In FIG. 7, the hydraulic pressure of the brake cylinder 52RL provided for the rear left wheel 46 is represented by solid line, the hydraulic pressure of the brake cylinder 52RR provided for the rear right wheel 48 is represented by broken line, and the rear-left/right-wheels total hydraulic pressure Ps is represented by one-dot chain line.

Where the relative phase $\delta a$ between the rear left and right wheels 46, 48 is about zero (0), the amplitude of the rear-left/right-wheels total hydraulic pressure Ps is made large, as shown in FIG. 7 (a). Where relative phase $\delta c$ between the rear left and right wheels 46, 48 is about $\pi/2$, the rear-left/right-wheels total hydraulic pressure Ps is substantially constant so that the amplitude of the rear-left/right-wheels total hydraulic pressure Ps is made considerably small, as shown in FIG. 7 (c). Where relative phase $\delta b$ between the rear left and right wheels 46, 48 is about $\pi/4$, the amplitude of the rear-left/right-wheels total hydraulic pressure Ps is intermediate between the case of (a) and the case of (c).

Thus, it is obvious that the amplitude of the rear-left/right-wheels total hydraulic pressure Ps can be changed by changing the relative phase, and that the control hunting can be suppressed by controlling the relative phase to a value that makes the amplitude of the rear-left/right-wheels total hydraulic pressure Ps small.

(C) Obtainment of Relative Phase

C-1) Rotational Angle

Each of the rotational velocity sensors 230 includes (a) a plurality of magnets (detected portions) that are provided on an outer circumferential surface of a rotary body (magnetic rotor) that is to be rotated integrally with a corresponding one of the wheels 2, 4, 46, 48 such that the plurality of magnets are equally spaced apart from each other in a circumferential direction of the rotary body and (b) a semiconductor (detecting portion: e.g., hall element) provided in a non-rotary body. When each of the magnets passes through a position opposed to the detecting portion, a magnetic field is changed whereby a pulse signal is outputted.

The rotational velocity of the corresponding one of the wheels 2, 4, 46, 48 is detected based on the number of the pulse signals per unit time. Further, the rotational angle from a reference angular position can be detected based on the number of the pulse signals as counted from the reference angular position.

A counted value of the pulse signal is zero (0) in the reference angular position, and is reset to zero (0) each time the rotated wheel passes through the reference angular position. The reference angular position may be any angular position.

Figure 8:
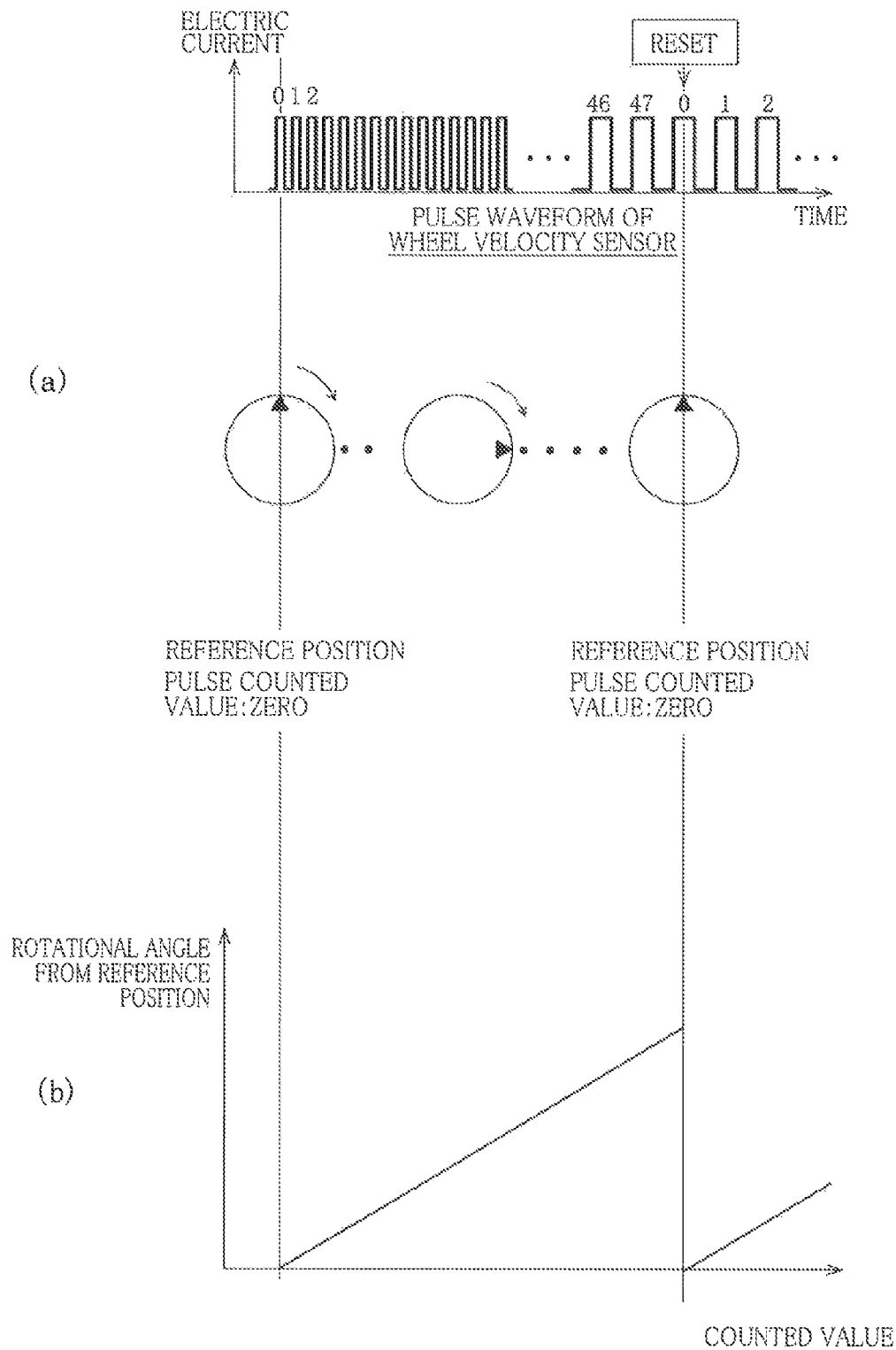
FIG. 8 is a set of views wherein the view (a) shows pulse signals outputted by rotation of the wheel and the view (b) shows a relationship between a counted number of the pulse signals and a rotational angle as measured from a reference angular position.

In the present embodiment, a total of 48 north poles and a total of 48 south poles are alternately arranged on the outer circumferential surface of the magnetic rotor, so that a total of 48 pulse signals are outputted during one rotation of the wheel, as shown in FIG. 8 (a). The number of the pulse signals is started to be counted when the drum 120 (wheel) is positioned in the reference angular position. As shown in FIG. 8 (b), as the counted value of the pulse signal is increased, a deviation of the actual angular position of the wheel from the reference angular position is increased, and the rotational angle is increased.

Where the counted value is always stored, it is possible to detect the rotational angle from the reference angular position. The counted value is stored even when an ignition switch is in OFF.

In the present embodiment, the rotational angle is increased by $2\pi/48$ each time the pulse signal is outputted, so that the rotational angle can be represented by the number (counted value) of the pulse signals.

It is noted that the rotational angle in a forward direction is represented by a positive value while the rotational angle in a reverse direction is represented by a negative value. In the following descriptions, the rotational angle refers to the rotational angle in the forward direction, unless otherwise specified.

C-2) Relative Phase

In the present embodiment, the relative phase $\delta$ is represented by, for convenience purpose, a deviation of the rotational angle of the rear left wheel 46 from the rotational angle of the rear right wheel 48 that corresponds to a reference rotational angle.

A value d, which is obtained by subtracting the rotational angle (i.e., the counted value of the pulse signals from the reference angular position) of the rear left wheel 46 from the rotational angle of the rear right wheel 48, is represented by an expression as follows:

d=NR−NL, where "NR" represents the counted value from the reference angular position in the rear right wheel 48 and "NL" represents the counted value from the reference angular position in the rear left wheel 46.

Figure 9:
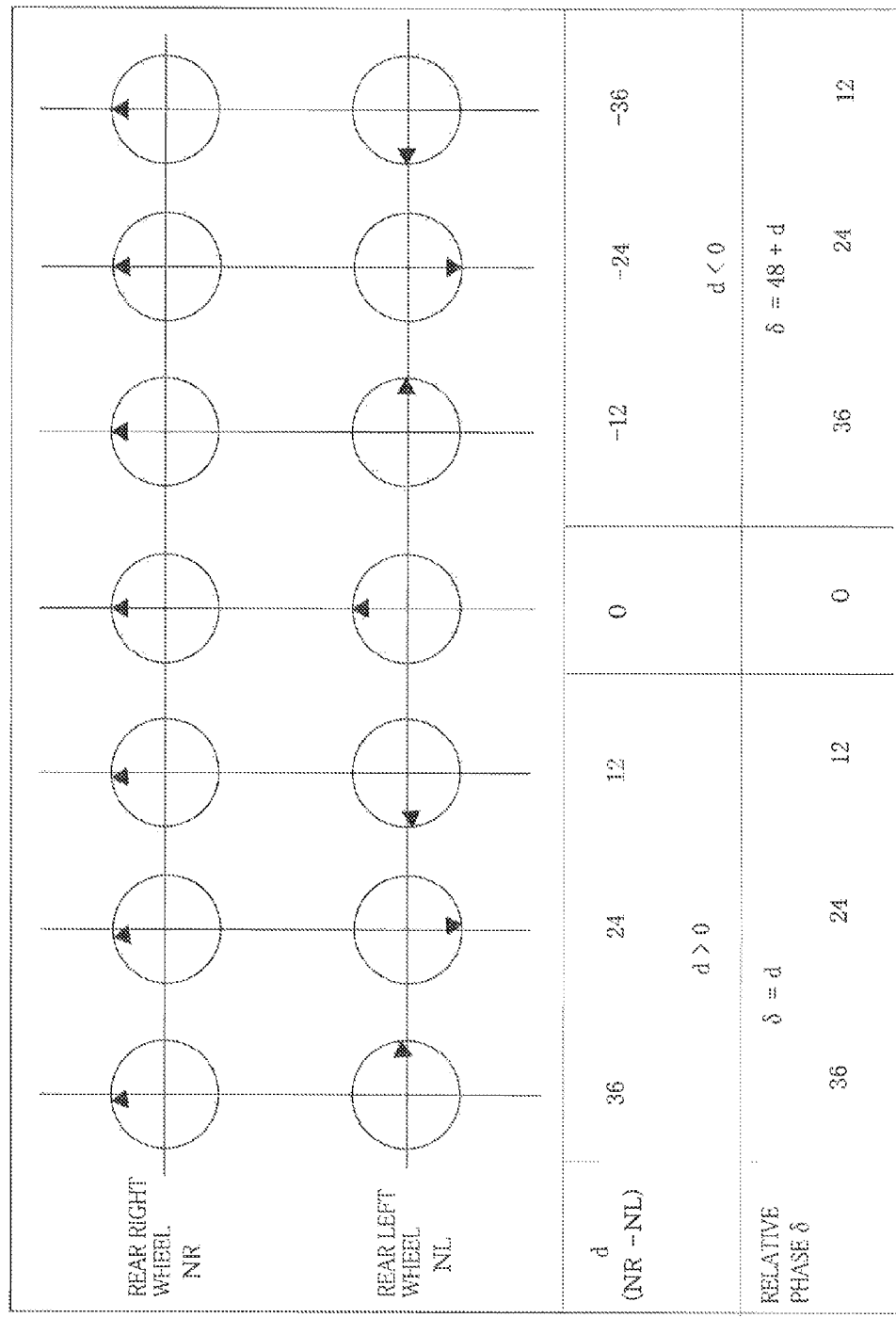
FIG. 9 is a view showing the relative phase between the left and right wheels.

As shown in FIG. 9, when the above-described value d is a positive value, the value d is regarded as the relative phase δ (δ=d). When the value d is a negative value, a value corresponding to a sum of the value d and 48 is regarded as the relative phase δ (δ=48+d).

As can be understood from FIG. 9, when the above-described value d is a negative value, namely, when the counted value in the rear left wheel 46 is larger than the counted value in the rear right wheel 48, the "value corresponding to the sum of the value d and 48" can be regarded as the relative phase, because the "value corresponding to the sum of the value d and 48" when the value d is a negative value is equal to the value d when the value d is a positive value. When the value d is a negative value, the relative phase is represented by a positive value corresponding to the relative phase that is established by the same phase difference.

(D) Obtainment of Change Characteristic

The change characteristic is a relationship between the relative phase δ and a variance as a value representing a state of change of the rear-left/right-wheels total hydraulic pressure Ps. The change characteristic may be obtained either during running of the vehicle, or in a manufacturing facility, for example, prior to shipment of the vehicle.

In the description of the present embodiment, there will be described a case where the change characteristic is obtained during running of the vehicle.

D-1) Detection of Rear-Left/Right-Wheels Total Hydraulic Pressure Ps

The rear-left/right-wheels total hydraulic pressure Ps is detected by the common hydraulic-pressure sensor 226.

Since the common hydraulic-pressure sensor 226 is provided in the common passage 110, a value including the hydraulic pressures of all of the brake cylinders 42, 52 provided for the four wheels is detected by the common hydraulic-pressure sensor 226 when the pressure holding valves 130 are placed in their open states. However, the disk brakes 40 are provided for the front left and right wheels 2, 4, and the hydraulic pressures of the brake cylinders 42 of the disk brakes 40 are periodically changed a very little with rotation of the wheels 2, 4. Therefore, it is possible to regard that the change of the value detected by the common hydraulic-pressure sensor 226 during one rotation of the wheels 2, 4, 46, 48 corresponds to the periodical change caused in the drum brakes 50. In this sense, the value detected by the common hydraulic-pressure sensor 226 is referred to as the rear-left/right-wheels total hydraulic pressure Ps.

D-2) Change-Characteristic Obtaining Condition

The rear-left/right-wheels total hydraulic pressure Ps is detected during running of the vehicle. More specifically, the rear-left/right-wheels total hydraulic pressure Ps is detected each time a given number of pulse signals are outputted during one rotation of the rear left and right wheels 46, 48, as long as all of the below-described requirements (i)-(iii) are met. The given number may be one, for example. The given number may be any number that makes it possible to accurately obtain a value representing the state of the change of the rear-left/right-wheels total hydraulic pressure Ps during one rotation of the wheel.

The requirement (i) is that the relative phase δ between the rear left and right wheels 46, 48 is kept constant.

Specifically described, there are requirements that the vehicle is not running on a gravel road, straddle road or the like, and that the vehicle is not in a turn (namely, the vehicle is running straight). For obtaining the relationship between the relative phase δ and the value representing the change state of the rear-left/right-wheels total hydraulic pressure Ps, the relative phase δ is required to be constant during detection of the rear-left/right-wheels total hydraulic pressure Ps.

It is considered that the requirement (i) is met when a plurality of sub-requirements are all met. The plurality of sub-requirements consist of sub-requirement (a) that the rotational velocity of each of the rear left and right wheels 46, 48 is kept constant, sub-requirement (b) that the rotational velocities of the rear left and right wheels 46, 48 are substantially equal to each other, and sub-requirement (c) that the turning-state detecting device 232 detects that the vehicle is not in a turn (for example, an absolute value of a steering angle of a steering wheel is not larger than a given value, or an absolute value of a yaw rate or lateral acceleration is not higher than a given value). It is also considered that the sub-requirement (c) is included in the sub-requirement (b). Further, it can be regarded that the sub-requirements (a), (b) are met when an absolute value of difference between the rational velocities of the rear left and right wheels 46, 48 detected by the rotational velocity sensors 230RL, 230RR is not larger than a given value.

The requirement (ii) is that each drum brake 50 is in its working state and the brake cylinder pressure is not changed by any other factor other than change of the hydraulic pressure of the brake cylinder 52 which is caused, for example, due to the shape of the drum brake 50

In other words, this requirement (ii) is met in a state in which the brake cylinder pressure would be kept constant if the wheel were not rotated, for example, a state in which the pressure hold mode is being set for controlling the hydraulic pressure of the common passage 110 and the target hydraulic pressure Pref is kept constant. When the pressure hold mode is being set, the common pressure-increasing control valve 140 and the common pressure-reducing control valve 142 are both being placed in their closed states, so that the region including the brake cylinders 42, 52, individual passages 112 and common passage 110 forms a closed region. Therefore, the hydraulic pressure is changed by a volumetric change of the cylinder chamber 128 of the brake cylinder 52. Further, it is considered that the pressure hold mode is maintained as long as the target hydraulic pressure Pref is kept constant.

The requirement (iii) is that the rear-left/right-wheels total hydraulic pressure Ps is at least a value (a given hydraulic pressure) that makes it possible to accurately recognize the change.

Specifically described, this requirement (iii) is met when the value Ps detected by the common hydraulic-pressure sensor 226 is not smaller than a given value.

When the above-described requirements (i)-(iii) are all met, it is regarded that the change-characteristic obtaining condition is satisfied, and the rear-left/right-wheels total hydraulic pressure Ps is detected.

D-3) Variance

In the present embodiment, the variance as the vale representing the state of change of the rear-left/right-wheels total hydraulic pressure Ps is obtained in accordance with an expression as follows:

$\sigma^2=\Sigma(Ps-<Ps>)^2/N$, where "$<Ps>$" represents an average value of the rear-left/right-wheels total hydraulic pressure Ps during one of the wheels and "N" represents a number of samples.

For example, as shown in FIG. 7, when the relative phase $\delta a$ between the rear left and right wheels 46, 48 is about zero (0), the variance $\sigma a^2$ becomes large. When the relative phase $\delta c$ between the rear left and right wheels 46, 48 is about 12 ($\pi/2$), the variance $\sigma c^2$ (=0) becomes small. When the relative phase $\delta b$ between the rear left and right wheels 46, 48 is about 6 ($\pi/4$), the variance $\sigma b^2$ is intermediate between the case of the relative phase $\delta a$ of zero and the case of the relative phase $\delta c$ of 12 ($\sigma a^2 > \sigma b^2 > \sigma c^2$).

Thus, it is understood that the variance is small where the detected value Ps is close to the average value, namely, where the change of the rear-left/right-wheels total hydraulic pressure Ps is small during one rotation of the wheel. It can be considered that the variance is a value that represents an amplitude of change of the brake cylinder pressure in the present embodiment, although the variance is a value that inherently represents a variation.

It is noted that FIG. 7 shows a theoretical change of the rear-left/right-wheels total hydraulic pressure Ps in a case where the hydraulic pressure of each brake cylinder 52 is changed only due to the elliptical shape of the corresponding drum 120 and the rear left and right wheels 46, 48 are the same as each other with respect to the reference angular position in relation with the shape of the drum 120.

However, actually, there is a case where the drum 120 is attached eccentrically. Further, there is a case where the drum brakes 50RL, 50RR provided for the rear left and right wheels 46, 48 are different from each other with respect to the shape of the drum 120 due to large manufacturing variation. Moreover, the reference angular position of the rear left wheel 46 in relation with the shape of the corresponding drum 120 and the reference angular position of the rear right wheel 48 in relation with the shape of the corresponding drum 120 are not necessarily the same as each other.

Figure 12:
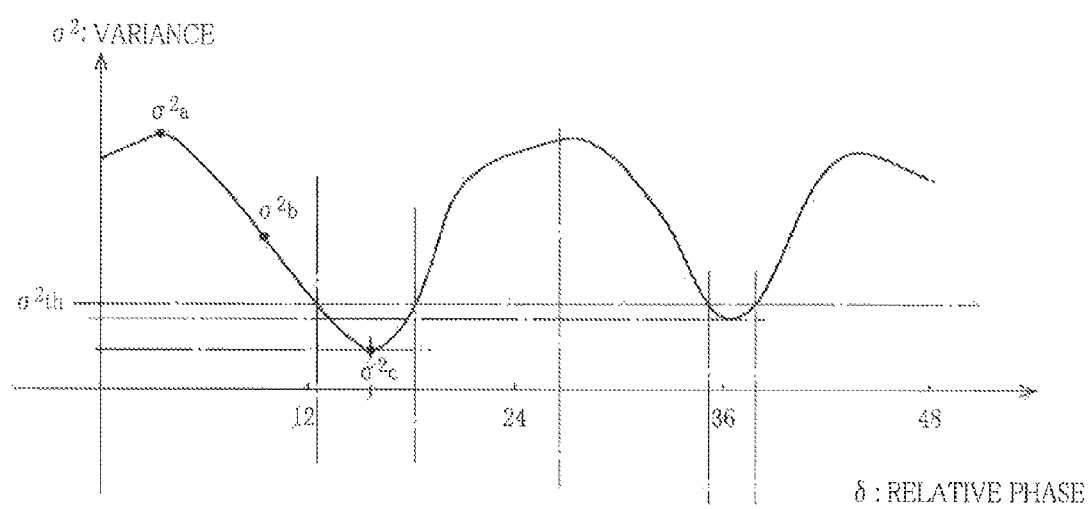
FIG. 12 is a table showing a change characteristic stored in a memory portion of a brake ECU of the above-described brake system.

Due to the above-described circumstances, in most cases, the minimum value of the variance $\sigma^2$ is not zero (0). There is a case where the variance $\sigma^2$ is not maximized when the relative phase $\delta$ is zero (0), and the variance $\sigma^2$ is not minimized when the relative phase $\delta$ is 12. FIG. 12 shows a relationship between the relative phase $\delta$ and the variance $\sigma^2$ by way of example.

The above-described change-characteristic obtaining condition is a condition that is easily satisfied during running of the vehicle. While the change-characteristic obtaining condition is being satisfied, the variance $\sigma^2$ is obtained based on the rear-left/right-wheels total hydraulic pressure Ps as the value detected by the common hydraulic-pressure sensor 226, and a set of the relative phase $\delta$ and the variance $\sigma^2$ is obtained whereby one of points cooperating with each other to define the change characteristic shown in FIG. 12 is determined.

The thus obtained change characteristic is stored in the change-characteristic storing portion 240 of the memory portion 173.

D-4) Change-Characteristic Obtaining Program

Figure 14:
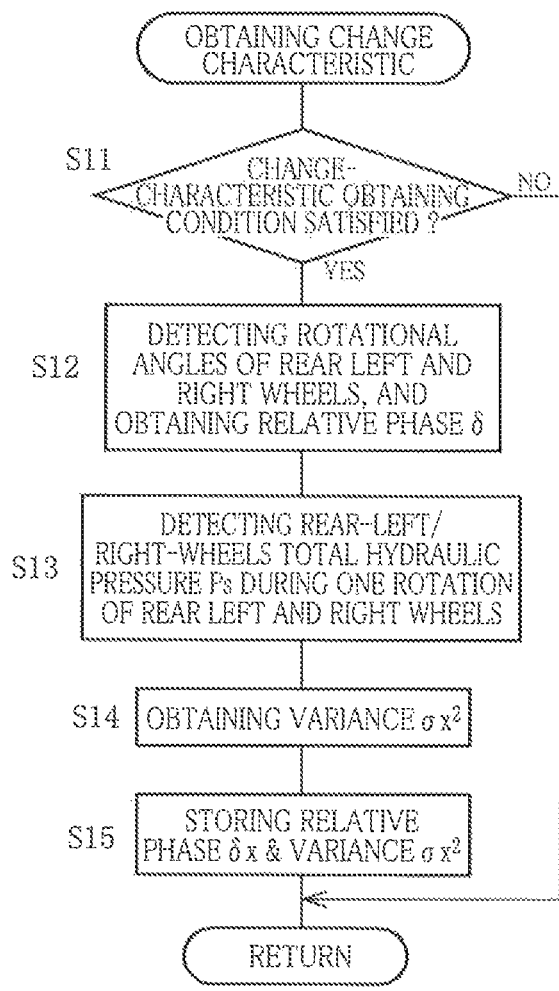
FIG. 14 is a flow chart representing a change-characteristic obtaining program stored in the above-described memory portion.

FIG. 14 shows a flow chart representing a change-characteristic obtaining program that is executed at a predetermined time interval.

In S11, it is judged whether the change-characteristic obtaining condition is satisfied or not. That is, it is judged whether the above-described requirements (i)-(iii) are all met or not.

When all of the requirements (i)-(iii) are met, a positive judgment (YES) is obtained in S11. In S12, the rotational angles NL, NR of the rear left and right wheels 46, 48 are detected, and the relative phase $\delta$ is obtained. In S13, the values Ps detected by the common hydraulic-pressure sensor 226 are obtained during one rotation of the rear left and right wheels 46, 48. In S14, the variance $\sigma x^2$ is obtained. In S15, the set of the relative phase $\delta x$ and the variance $\sigma x^2$ is stored.

By execution of the change-characteristic obtaining program a plurality of times, a multiplicity of different sets of the relative phase $\delta x$ and the variance $\sigma x^2$ are obtained whereby the actual change characteristic is obtained.

In the present embodiment, the change characteristic is obtained based on the variance $\sigma^2$ that is obtained for the relative phase $\delta$ of entire range (0-47). However, it is not essential that the variance $\sigma^2$ is obtained for the relative phase $\delta$ of entire range (0-47).

After the change characteristic has been obtained based on the variance $\sigma x^2$ obtained for the relative phase $\delta$ of entire range, the variance $\sigma x^2$ may not be obtained even upon satisfaction of the change-characteristic obtaining condition, or the variance $\sigma x^2$ may be obtained upon satisfaction of the change-characteristic obtaining condition so that the change characteristic is modified as needed.

Hereinafter, there will be described control of the rotational angle where the change characteristic has been obtained based on the variance $\sigma x^2$ obtained for the relative phase $\delta$ of entire range.

(E) Control of Rotational Angle

E-1) Fundamental Content of the Control

The relative phase, which is established when the variance $\sigma x^2$ is a given value $\sigma^2$th, is set as a provisional target relative phase $\delta$refn. In a case where there are a plurality of provisional target relative phases $\delta$refn, one of the plurality of provisional target relative phases $\delta$refn is selected based on the actual relative phase $\delta$ between the rear left and right wheels 46, 48, and the rotational angle of one of the rear left and right wheels 46, 48 is controlled such that the actual relative phase $\delta$ becomes close to the target relative phase $\delta$ref.

Figure 10:
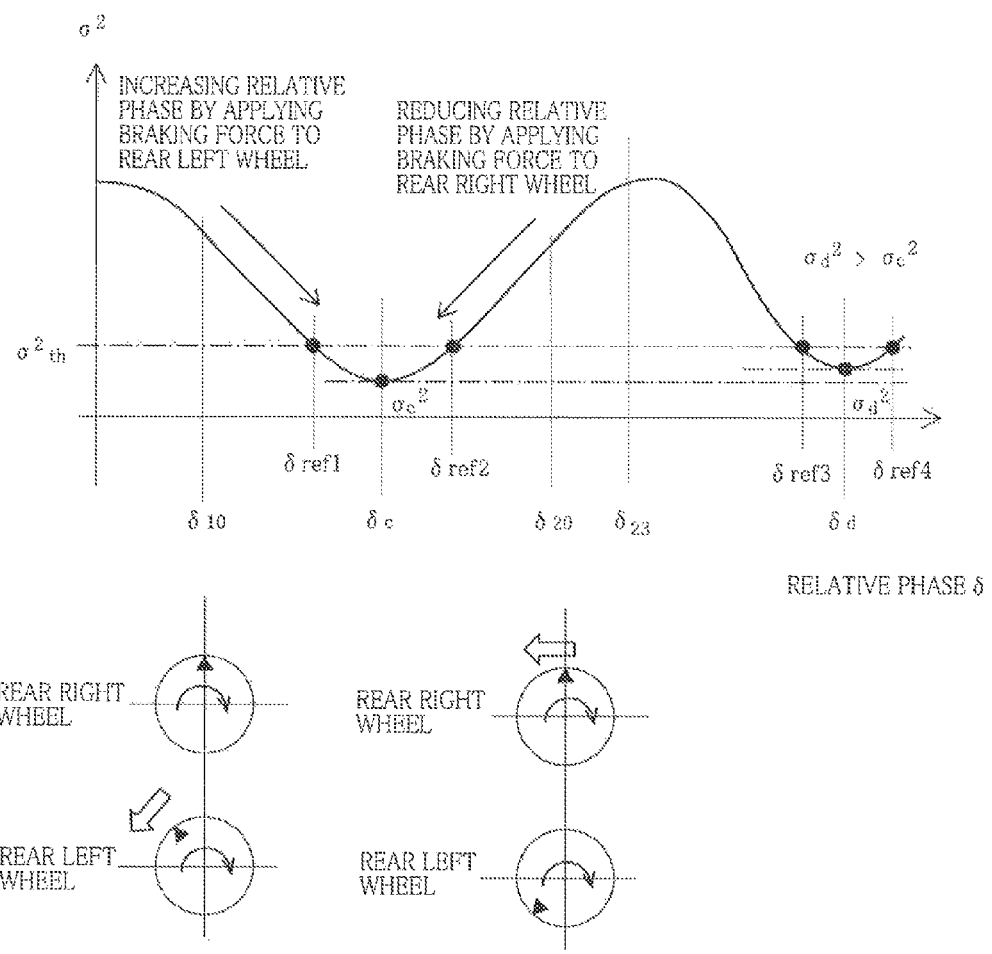
FIG. 10 is a view for explaining a basis content of a rotational angle control executed in the above-described brake system.

FIG. 10 shows a case where there are four provisional target relative phases $\delta$ref1, $\delta$ref2, $\delta$ref3, $\delta$ref4. In this case, the actual relative phase $\delta$ between the rear left and right wheels 46, 48 is obtained, and one of the four provisional target relative phases $\delta$ref1, $\delta$ref2, $\delta$ref3, $\delta$ref4, which is the closest to the actual relative phase $\delta$, is selected as the target relative phase.

For example, when the actual relative phase is $\delta_{20}$, the provisional target relative phase $\delta$ref2 is selected as the target relative phase, because the provisional target relative phase $\delta$ref2 is closest to the actual relative phase is $\delta_{20}$. Since the relative phase $\delta_{20}$ is larger than the provisional target relative phase $\delta$ref2, the rotational angle of the rear right wheel 48 is reduced by increasing the hydraulic pressure of the brake cylinder 52 provided for the rear right wheel 48, so that the actual relative phase is reduced. Thus, the relative phase $\delta$, which is obtained by subtracting the rotational angle of the rear left wheel 46 from the rotational angle of the rear right wheel 48, is reduced so as to become close to the provisional target relative phase $\delta$ref2.

When the actual relative phase is $\delta_{10}$, the provisional target relative phase $\delta$ref1 is selected as the target relative phase. In this case, by increasing the hydraulic pressure of the brake cylinder 52 provided for the rear left wheel 46, the actual relative phase is increased. Thus, the relative phase $\delta$ is increased so as to become close to the provisional target relative phase $\delta$ref1.

When the relative phase δ is between the provisional target relative phases δref1, δref2, the control of the rotational angle is not executed because the variance σx² is smaller than the given value σ²th.

When one of the provisional target relative phases δref1, δref2 is selected as the target relative phase, the actual relative phase δ may be controlled to a value between the provisional target relative phases δref1. δref2.

δref1<δ<ref2

In other words, it is not essential that the actual relative phase δ is made equal to the provisional target relative phase δref1 or δref2. The control may be executed such that the actual relative phase δ is caused to exceed the provisional target relative phase δref1 or δref2.

On the other hand, when the target relative phase cannot be determined, for example, when the actual relative phase $δ_{23}$ is precisely intermediate between the provisional target relative phases δref2 and δref3 {$δ_{23}$=(δref2+δref3)/2}, bottom values σc², σd² of the variance σ² are compared with each other (σd²>σc²), and the provisional target relative phase δref2 corresponding to a smaller one σc² of the bottom values σc², σd² is selected as the target relative phase.

This is because the amplitude of change of the rear-left/right-wheels total hydraulic pressure Ps can be made smaller where the relative phase δ is controlled to a value between the provisional target relative phases δref1 and δref2 (δref1<δ<δref2), than where the relative phase δ is controlled to a value between the provisional target relative phases δref3 and δref4 (δref3<δ<δref1).

It is noted that the provisional target relative phase δref may be each of the relative phases δrefc, δrefd corresponding to the bottom values σc², σd², or may be the relative phase δrefc that minimizes the variance σ². In the latter case, the provisional target relative phase is a single value so that the provisional target relative phase is always in coincident with the target relative phase.

Further, it is possible to store a target-relative-phase determining table in which an actual relative phase and a target relative phase corresponding to the actual relative phase are associated with each other, so that, once the change characteristic is determined, the target relative phase can be uniquely determined for the actual relative phase. In this case, the change characteristic does not necessarily have to be stored. The target-relative-phase determining table may be stored in a target-relative-phase-determining-table storing portion (not shown) that is other than the change-characteristic storing portion 240.

E-2) Condition for Execution of Rotational Angle Control (E-2-1) In the present embodiment, the rotational angle is controlled during a non-working state of each drum brake 50, because it is preferable to establish a state in which the change of the rear-left/right-wheels total hydraulic pressure Ps is small, before initiation of activation of the drum brake 50.

However, if the rotational velocities of the rear left and right wheels 46, 48 are made different from each other before activation of the drum brake 50, the relative phase δ (that has been caused to become close to the target relative phase δref) is deviated from the target relative phase δref.

In view of this, in the present embodiment, the rotational angle control is executed when there is a high possibility that the drum brake 50 is to be activated.

Figure 11:
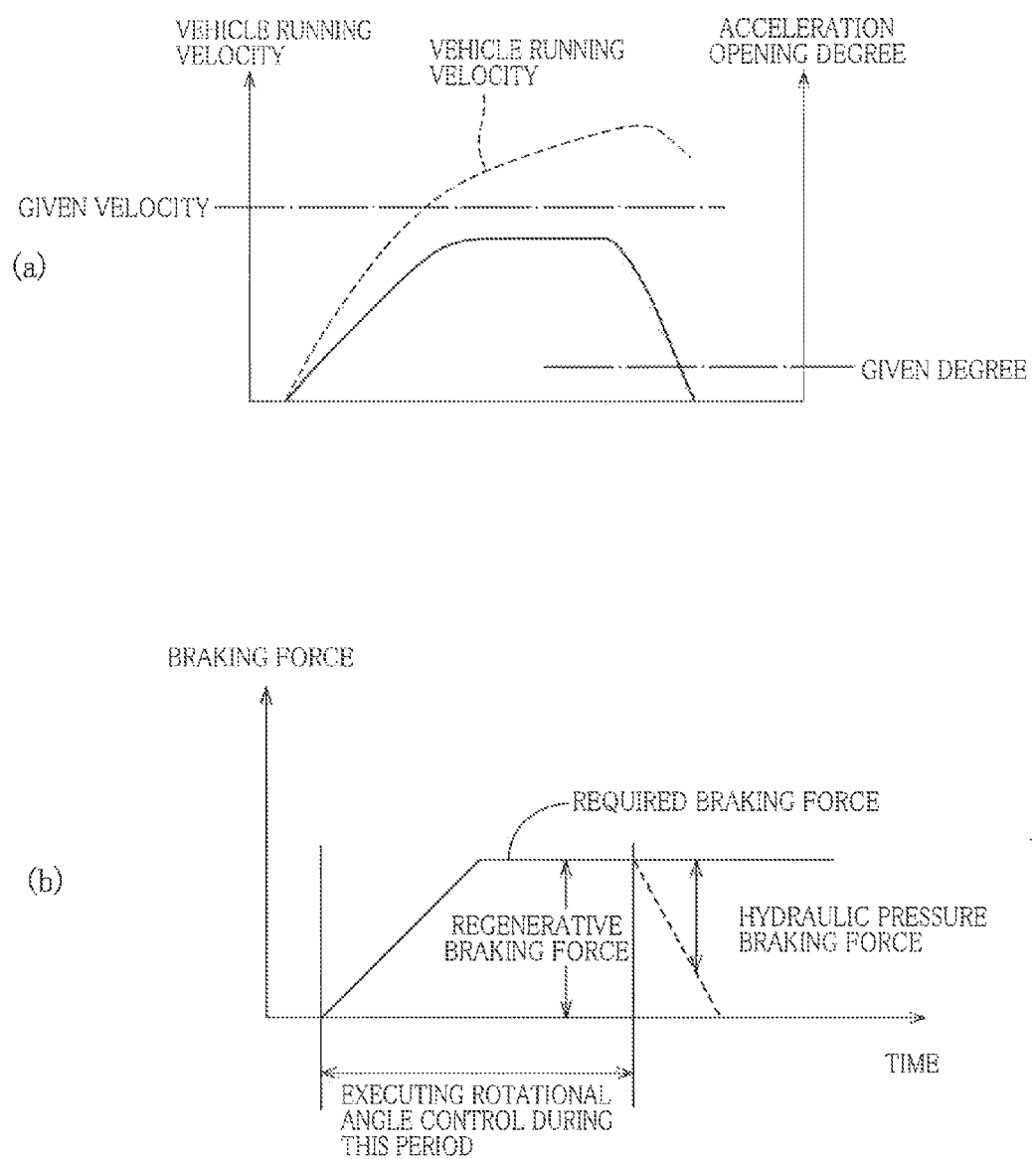
FIG. 11 is a set of views wherein the view (a) shows a relationship between a running velocity of the above-described vehicle and an operational state of an acceleration pedal of the vehicle and the view (b) shows change of braking forces in case of execution of a regenerative cooperative control in the above-described brake system.

Specifically described, the rotational angle control is executed in a case when the acceleration pedal is released from a state in which the acceleration pedal is depressed (i.e., a case when the acceleration opening degree is changed from a degree lager than a given degree such as zero degree, to a degree not larger than the given degree), as shown in FIG. 11 (a) and in a case when only the regenerative braking force works during execution of the regenerative cooperative control, as shown in FIG. 11 (b). In these cases, it can be considered that there is a high possibility that the drum brake 50 is to be activated in the near future.

When the brake pedal 60 is operated during running of the vehicle at a middle or high running velocity, the regenerative braking force is limited due to condition of the storage device 22. Therefore, the required braking force Fsref cannot be satisfied by the regenerative braking force Fm so that there is a possibility that the hydraulic braking force Fp is applied (the hydraulic brakes 40, 50 are activated) from an initial stage of the braking operation. Thus, there is a high necessity that the rotational angle control is executed before initiation of operation of the brake pedal 60. In the present embodiment, it is judged whether there is a high possibility that the brake pedal 60 is to be operated (i.e., a high possibility that the hydraulic brakes 40, 50 are to be activated), wherein this judgment is made based on the value detected by the acceleration opening-degree sensor 234. Described specifically, during running of the vehicle at a middle or high running velocity, when depression of the acceleration pedal is released and/or when the acceleration pedal is returned at a velocity not lower than a given velocity, it is judged that there is a high possibility that the brake pedal 60 is to be operated, and the rotational angle control is executed.

On the other hand, when the brake pedal 60 is operated during running of the vehicle at a low running velocity, it is often that the required braking force FSref is satisfied by the regenerative braking force Fm because the regenerative braking force is not limited. Thus, it is often that the regenerative braking force is applied with the hydraulic brakes 40, 50 being held in their non-working states at an initial stage of the braking operation. Therefore, after the brake pedal 60 is operated, the rotational angle control is executed in a state in which the regenerative braking force is applied with the hydraulic brakes 40, 50 being held in their non-working states.

When the brake pedal 60 is rapidly operated during running of the vehicle at a low running velocity, it is presumed that the vehicle will be immediately stopped. Further, there is a case where not only the regenerative braking force is applied but also the hydraulic brakes 40, 50 are activated. Therefore, the rotational angle control is not executed.

In view of the above-described circumstances, in the present embodiment, the rotational angle control is executed in (a) a case when (i) the running velocity of the vehicle is not lower than a given velocity and (ii) the value detected by the acceleration opening-degree sensor 234 is reduced from a degree lager than a given degree, to a degree smaller than the given degree, and/or the value detected by the acceleration opening-degree sensor 234 is reduced at a reduction rate that is larger a given rate (see FIG. 11 (a)), and in (b) a case when (i) the running velocity of the vehicle is lower than a given velocity and (ii) the brake switch 118 is turned ON with the brake pedal 60 being operated at an operating velocity not higher than a given velocity (see FIG. 11 (b)).

(E-2-2) The rotational angle control is executed in a state in which the relative phase between the rear left and right wheels 46, 48 is not changed by any other factor other than the execution of the rotational angle control.

The rotational angle control is executed when the vehicle is running almost straight on a rod surface that is other than a gravel road and a straddle road.

E-3) Yaw Moment Suppression Control

By application of the hydraulic pressure to one of the brake cylinders 52 provided for the rear left and right wheels 46, 48, a yaw moment is easily generated. For avoiding the generation of the yaw moment, in the present embodiment, the hydraulic pressure of the brake cylinder 42 provided for the wheel located in a position diagonal to one of the rear left and right wheels 46, 48 which is subjected to the control, is also controlled in the same manner as the hydraulic pressure of the brake cylinder 52 provided for the wheel subjected to the control. For example, when the hydraulic pressure is applied to the brake cylinder 52RR provided for the rear right wheel 48 in the rotational angle control, the hydraulic pressure is applied to the brake cylinder 42FL provided for the front left wheel 2, in the same manner.

It is noted that the yaw moment suppression control can be executed also by controlling a steering angle of the wheel.

Further, the execution of the yaw moment suppression control is not essential. This is because the brake cylinder pressure applied in the execution of the rotation angle control is not so high.

E-4) Hydraulic-Brake-Non-Working-State Rotational-Angle Control Program

Figure 15:
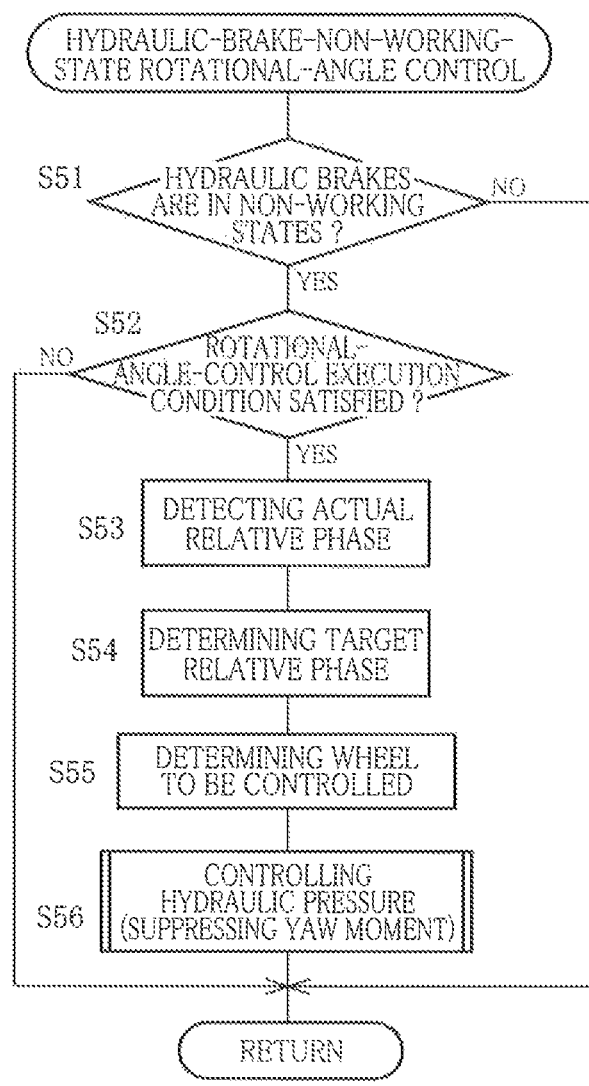
FIG. 15 is a flow chart representing a hydraulic-brake-non-working-state rotational-angle control program stored in the above-described memory portion.

FIG. 15 shows a flow chart representing a hydraulic-brake-non-working-state rotational-angle control program that is executed at a predetermined time interval. In S51, it is judged whether the hydraulic brakes 40, 50 are placed in their non-working states or not. When the hydraulic brakes 40, 50 are placed in the non-working states, S52 is implemented to judge whether a rotational-angle-control execution condition is satisfied or not, namely, whether the above-described requirements (E-2-1) and (E-2-2) are met or not. When at least one of the requirements (E-2-1) and (E-2-2) is not met, the rotational angle control is not executed.

When both of the requirements (E-2-1) and (E-2-2) are met, it is regarded that the rotational-angle-control execution condition is satisfied, so that the rotational angle control is executed.

In S53, the actual relative phase δ is detected. In S54, the target relative phase δref is selected. In S55, the wheel that is to be subjected to the control is determined. In S56, the hydraulic pressure is applied to the brake cylinder 52 provided for the wheel subjected to the control such that the actual relative phase is caused to become close to the target relative phase δref, while the hydraulic pressure is applied also to the brake cylinder 42 provided for the wheel located in a position diagonal to the wheel subjected to the control.

For example, when the wheel subjected to the control is the rear right wheel 48, the common pressure-increasing control valve 140 is placed from its closed state to its open state (an opening degree of the valve 140 is controlled), the pressure holding valves 130RL, 130FR are placed in their closed states, and the pressure holding valves 130RR, 130FL are controlled (for example, the pressure holding valves 130RR, 130FL may be subjected to a duty-ratio control). Thus, the hydraulic pressure of the accumulator 66 is supplied, via the common passage 110, to the brake cylinder 52RR provided for the rear right wheel 48 and the brake cylinder 42FL provided for the front left wheel 2.

Thus, the rotational angle control is executed whereby the relative phase δ between the rear left and right wheels 46, 48 is caused to become close to the target relative phase δref, so that it is possible to restrain change of the rear-left/right-wheels total hydraulic pressure Ps and to suppress the control hunting, when the drum brakes 50 are activated by supply of the hydraulic pressure to the brake cylinders 52, after the execution of the rotational angle control.

Further, the hydraulic-brake-non-working-state rotational angle control is executed a plurality of times while the rotational-angle-control execution condition is being satisfied.

Therefore, even if the relative phase is deviated from the target relative phase, due to, for example, turning of the vehicle after the execution of the rotational angle control, it is possible to cause the relative phase to become close to the target relative phase again.

However, the execution of the hydraulic-brake-non-working-state rotational angle control may be inhibited after the control has been executed at least once even if the rotational-angle-control execution condition is satisfied after the execution, because the hydraulic-brake-non-working-state rotational angle control is executed when there is a high possibility that the drum brakes 50 will be executed.

In the present embodiment, a change-characteristic obtaining device is constituted by, for example, portions of the brake ECU 56 which are assigned to store and execute the change-characteristic obtaining program represented by the flow chart of FIG. 14. A relative-phase obtaining device is constituted by, for example, portions of the brake ECU 56 which are assigned to store and implement S12. A variance obtaining portion is constituted by, for example, portions of the brake ECU 56 which are assigned to store and implement S14. A variance change-characteristic obtaining portion is constituted by, for example, portions of the brake ECU 56 which are assigned to store and implement S15. A condition-satisfaction-time total-braking-force obtaining portion is constituted by, for example, portions of the brake ECU 56 which are assigned to store and implement S11 and S13. A running-state-total-braking-force obtaining portion is constituted by, for example, portions of the brake ECU 56 which are assigned to store and implement S13.

A rotational-angle controlling device is constituted by, for example, portions of the brake ECU 56 which are assigned to store and execute the hydraulic-brake-non-working-state rotational-angle control program represented by the flow chart of FIG. 15. The rotational-angle controlling device serves also as a friction-braking-force controlling portion, a non-working-state controlling portion, a regenerative-brake-action-time controlling portion and a acceleration-releasing-time controlling. A target-relative-phase determining portion is constituted by, for example, portions of the brake ECU 56 which are assigned to store and implement S54. A first-wheel-rotation restriction controlling portion and a second-wheel-rotation restriction controlling portion are constituted by portions of the brake ECU 56 which are assigned to store and implement S56. Further, a yaw-moment suppression device is constituted by, for example, the disk brakes 42, the pressure holding valves 130FL, 130FR and portions of the brake ECU 56 which are assigned to store and implement S56.

Embodiment 2

In Embodiment 1, the rotational angle control is executed when the hydraulic brakes 40, 50 are placed in their non-working states. However, the rotational angle control may be executed when the hydraulic brakes 40, 50 are placed in their working states.

In the present embodiment, during the working states of the hydraulic brakes 50, a rate of change of the hydraulic pressure of one of the brake cylinders 52 provided for the rear left and right wheels 46, 48, relative to a rate of change of the hydraulic pressure of the other of the brake cylinders 52 provided for the rear left and right wheels 46, 48, is controlled.

Figure 16:
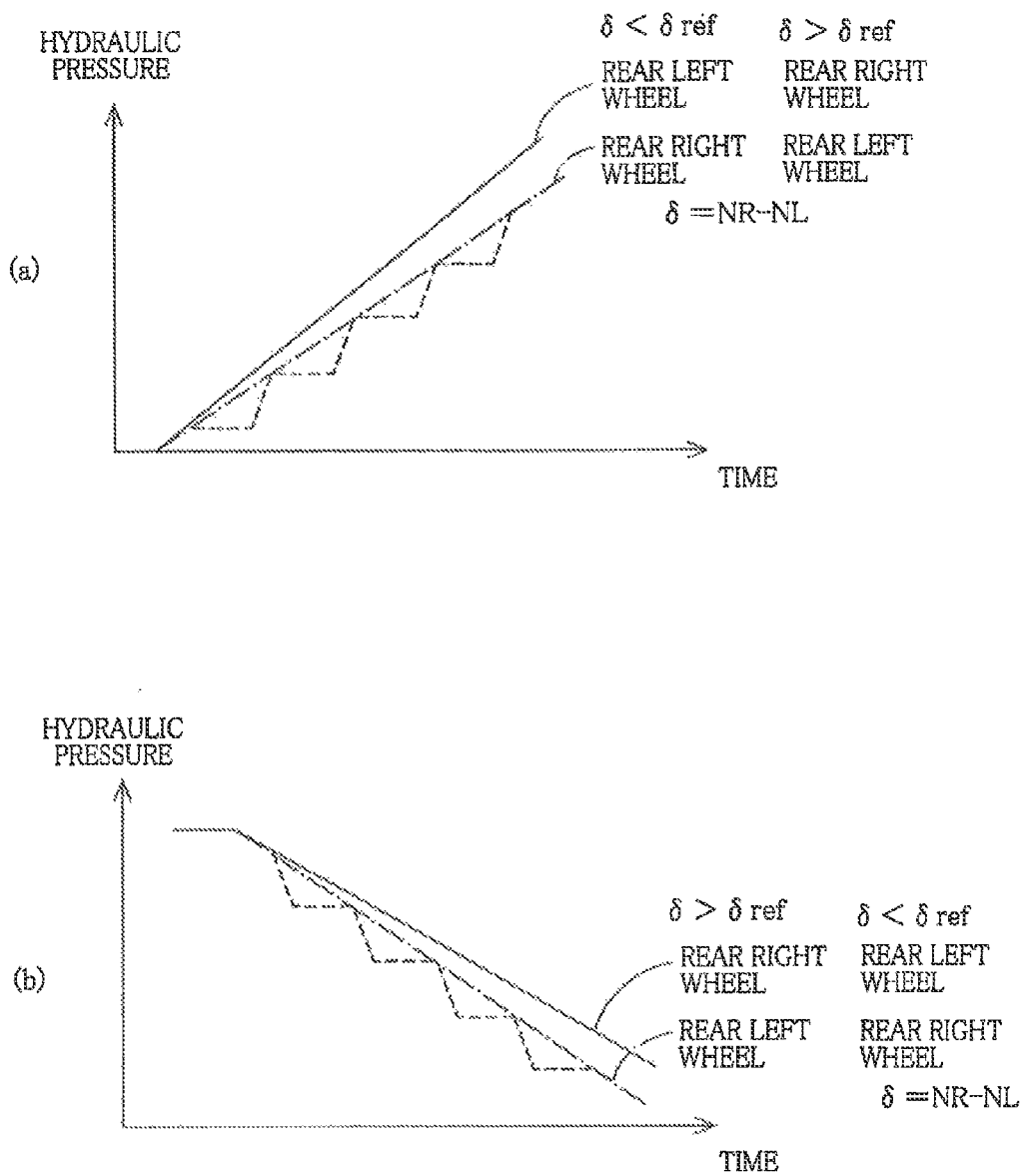
FIG. 16 is a set of views showing change of a hydraulic pressure of a brake cylinder in case (Embodiment 2) of execution of another rotational angle control in the above-described brake system, wherein the view (a) shows a control for a rate of change upon increase of the hydraulic pressure of the brake cylinder and the view (b) shows a control for a rate of change upon reduction of the hydraulic pressure of the brake cylinder.

When the hydraulic pressure of each of the brake cylinders 52 tends to be increased as shown in FIG. 16 (a), if the actual relative phase δ is smaller than the target relative phase δref, the pressure holding valve 130RL provided for the rear left wheel 46 is fully open while the pressure holding valve 130RR provided for the rear right wheel 48 is subjected to a duty-ratio control, whereby a rate of increase of the hydraulic pressure of the brake cylinder 52RR provided for the rear right wheel 48 is made smaller than a rate of increase of the hydraulic pressure of the brake cylinder 52RL provided for the rear left wheel 46. Thus, the rotational velocity of the rear right wheel 48 is made higher than the rotational velocity of the rear left wheel 46, so that the actual relative phase δ is increased so as to become close to the target relative phase δref. It is noted that the hydraulic pressure of the common passage 110 is increased by controlling the common pressure-increasing control valve 140, and the hydraulic pressure of the common passage 110 is supplied to the brake cylinders 52 during the open states of the pressure holding valves 130.

If the actual relative phase δ is lager than the target relative phase δref, the pressure holding valve 130RR provided for the rear right wheel 48 is fully open while the pressure holding valve 130RL provided for the rear left wheel 46 is subjected to a duty-ratio control, whereby a rate of increase of the hydraulic pressure of the brake cylinder 52RL provided for the rear left wheel 46 is made smaller than a rate of increase of the hydraulic pressure of the brake cylinder 52RR provided for the rear right wheel 48. Thus, the actual relative phase δ is reduced so as to become close to the target relative phase δref.

When the hydraulic pressure of each of the brake cylinders 52 tends to be reduced as shown in FIG. 16 (b), if the actual relative phase δ is larger than the target relative phase δref, the pressure reducing valve 131RR provided for the rear right wheel 48 is fully closed while the pressure reducing valve 131RL provided for the rear left wheel 46 is subjected to a duty-ratio control, whereby a rate of reduction of the hydraulic pressure of the brake cylinder 52RL provided for the rear left wheel 46 is made larger than a rate of reduction of the hydraulic pressure of the brake cylinder 52RR provided for the rear right wheel 48. Thus, the actual relative phase δ is reduced so as to become close to the target relative phase δref.

It is noted that the hydraulic pressure of the common passage 110 is reduced by controlling the common pressure-reducing control valve 142, and the working fluid is caused to flow out to the reservoir 82 via the common passage 110 during the open state of the pressure holding valve 130. On the other hand, while the pressure reducing valve 131 is being subjected to the duty-ratio control, the hydraulic pressure is reduced with the working fluid flowing out via the pressure holding valve 130 and the pressure reducing valve 131.

If the actual relative phase δ is smaller than the target relative phase δref, the pressure reducing valve 131RL provided for the rear left wheel 46 is fully closed while the pressure holding valve 130RR provided for the rear right wheel 48 is subjected to a duty-ratio control, whereby a rate of reduction of the hydraulic pressure of the brake cylinder 52RR provided for the rear right wheel 48 is made larger than a rate of reduction of the hydraulic pressure of the brake cylinder 52RL provided for the rear left wheel 46. Thus, the actual relative phase δ is increased so as to become close to the target relative phase δref.

Figure 17:
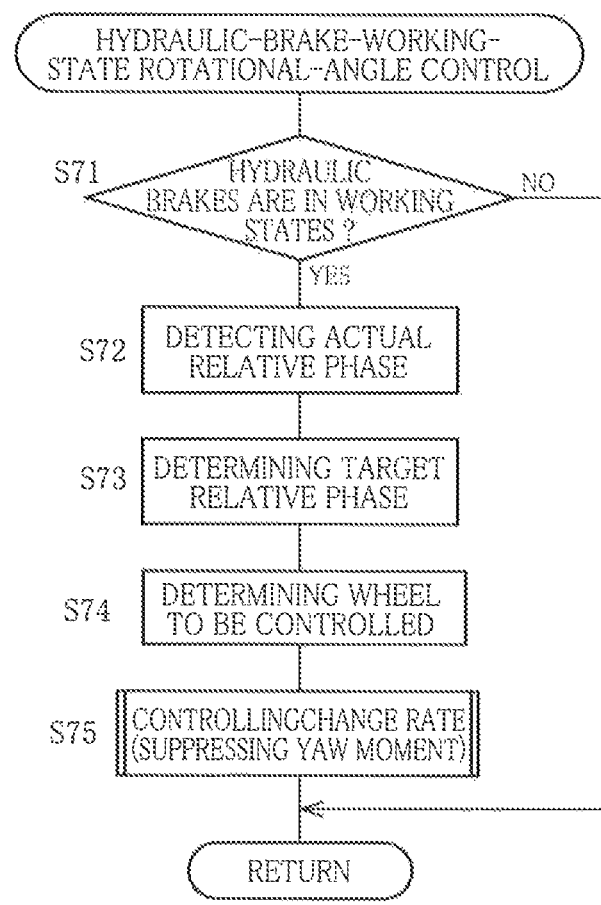
FIG. 17 is a flow chart representing a hydraulic-brake-working-state rotational-angle control program stored in the above-described memory portion.

FIG. 17 is a flow chart representing a hydraulic-brake-working-state rotational-angle control program that is executed at a predetermined time interval.

In S71, it is judged whether the hydraulic brakes 50 are placed in their working states or not. When the hydraulic brakes 50 are placed in the working states, the actual relative phase is detected in S72. In S73, the target relative phase is selected. In S74, the wheel that is to be subjected to the control is determined, so that the corresponding pressure holding valve 130 or pressure reducing valve 131, which is provided for the control-subjected wheel, is to be subjected to a duty-ratio control. In S75, the duty-ratio control is executed for the corresponding pressure holding valve 130 or pressure reducing valve 131 provided for the control-subjected wheel that is one of the rear left and right wheels 46, 48, and the duty-ratio control is executed also for the pressure holding valve 130 or pressure reducing valve 131 provided for a wheel that is located in a position diagonal to the control-subjected wheel.

It is noted that an actual difference between the brake cylinder pressures with respect to the rate of change is considerably small, although the changes of the brake cylinder pressures are described in FIG. 16 in a manner that clarifies the difference therebetween with respect to the rate of change. Therefore, the execution of the yaw moment suppression control is not essential.

Further, the rotational angle control may be executed either repeatedly or only once during the working states of the hydraulic brakes 50. Where the rotational angle control is executed only once, it is preferable that the control is executed upon initiation of the activations of the drum brakes 50, i.e., upon increase of the hydraulic pressures of the brake cylinders 52.

In the present embodiment, an active-state controlling portion is constituted by, for example, portions of the brake ECU 56 which are assigned to store and execute the hydraulic-brake-working-state rotational-angle control program that is represented by the flow chart of FIG. 17. A braking-force-change-rate controlling portion is constituted by, for example, portions of the brake ECU 56 which are assigned to store and implement 875.

Embodiment 3

In Embodiments 1 and 2, the rotational angle is controlled by controlling the hydraulic pressures of the brake cylinders 52. However, where the rear left and right wheels 46, 48 are provided with respective parking brakes in which the braking forces applied to the respective wheels are controllable independently of each other, the braking forces can be applied by activating the parking brakes.

Figure 18:
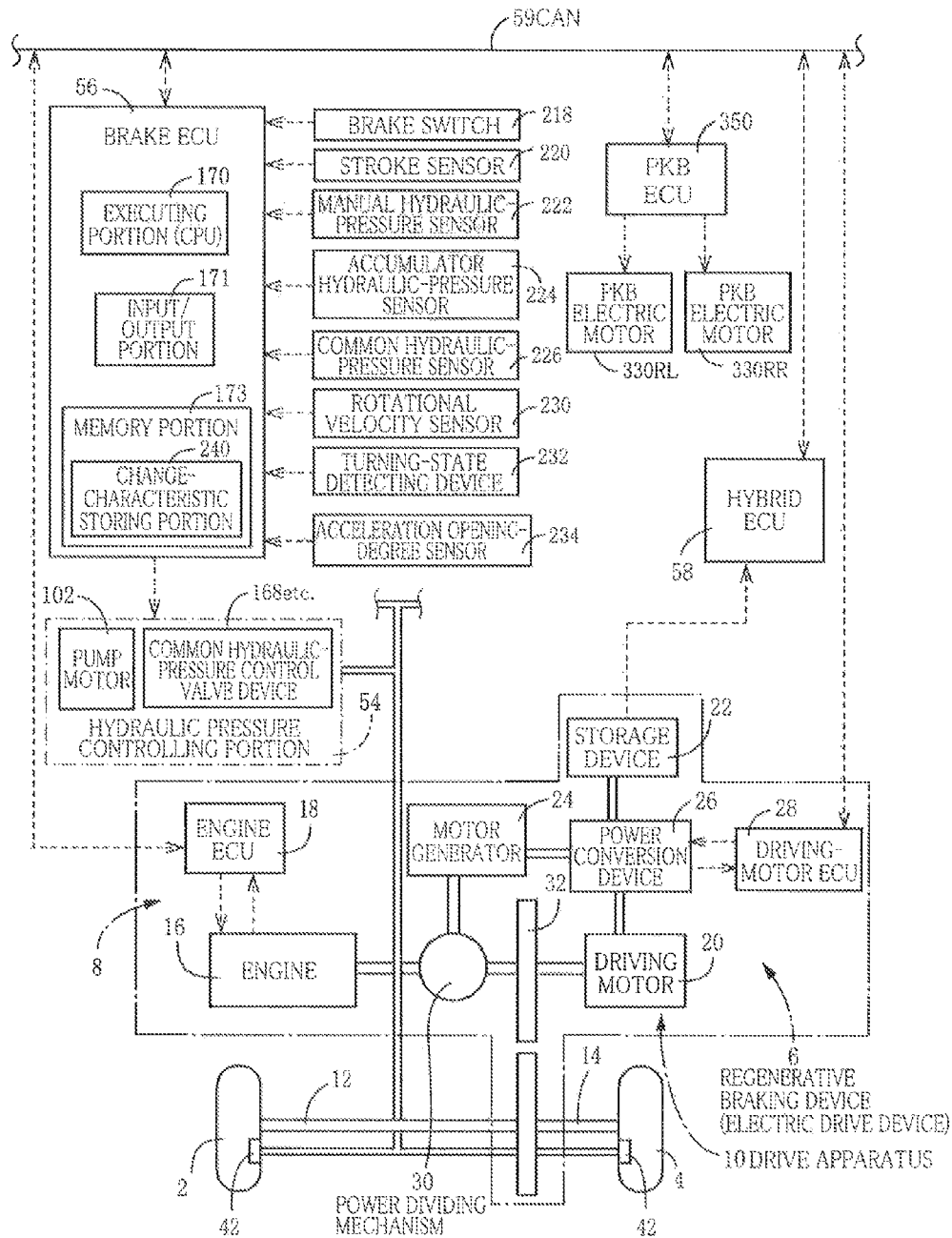
FIG. 18 is a view showing an entirety of a vehicle in which a brake system according to Embodiment 3 of the present invention is installed.
Figure 19:
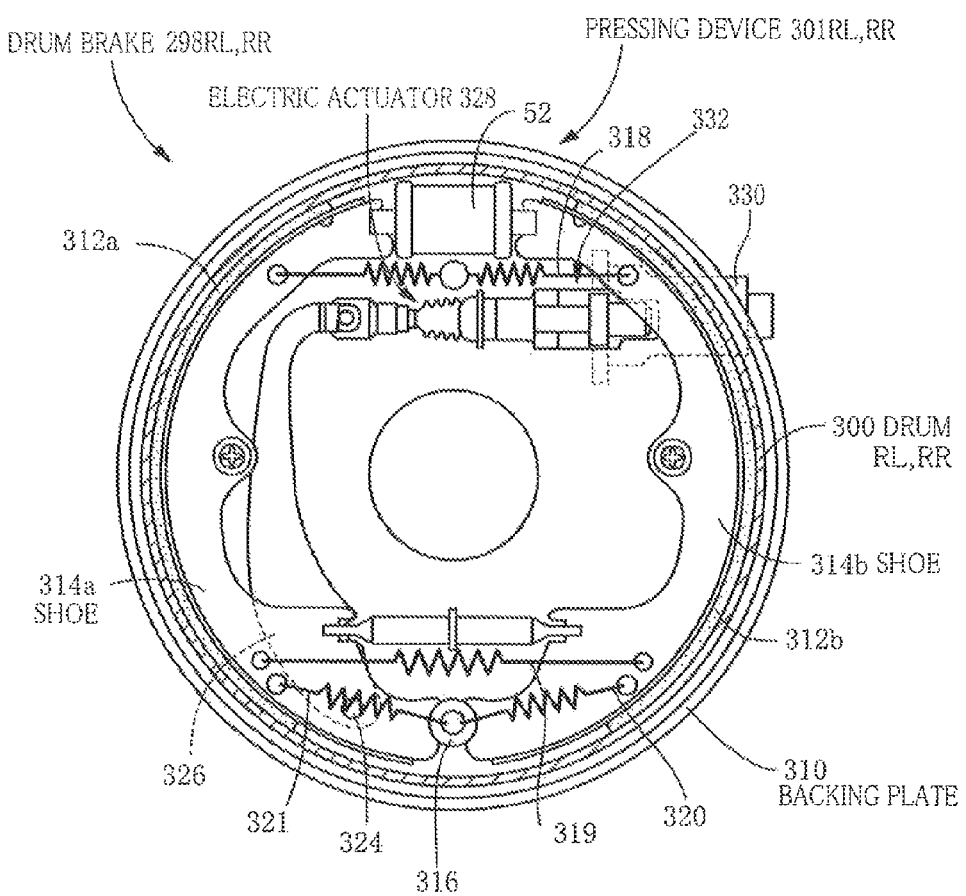
FIG. 19 is a cross sectional view of a drum brake of the above-described brake system.

An example of this arrangement is shown by FIGS. 18 and 19. Since the other construction is substantially the same as in Embodiments 1 and 2, the description thereof will not be provided.

As shown in FIG. 19, drum brakes 298RL, 298RR, which are provided in a hydraulic brake system according to the present embodiment, include respective drums 300RL, 300RR which are rotatable integrally with the respective rear wheels 46, 48, and pressing devices 301RL, 301RR configured to press respective friction engaging members against the respective drums 300RL, 300RR. Each of the pressing devices 301RL, 301RR includes both of a pressing device for a service brake and a pressing device for a parking brake, and the pressing devices for the service and parking brakes include respective parts that are constituted by the same part common to the pressing devices for the service and parking brakes.

Each of the pressing devices 301RL, 301RR includes (i) a pair of shoes 314a, 314b which are held by a backing plate 310 and which have respective friction engaging members 312a, 312b disposed on their respective outer circumferential surfaces, (ii) the brake cylinder 52 configured to displace the shoes 314a, 314b toward and away from each other, (iii) an anchor 316 fixed on the backing plate 310, (iv) a plurality of return springs 318-321, (v) a brake lever 326 engaged at one of its opposite end portions with the shoe 314a, pivotably about a pin 324, and (vi) an electric actuator 328 connected to the other of the opposite end portions of the brake lever 326. The electric actuator 328 includes a parking-brake electric motor 330 disposed on a back side of the backing plate 310 and a motion converting mechanism 332 equipped with a clutch function.

The brake lever 326 is pivoted by activation of the parking-brake electric motor 330 whereby the pair of shoes 314a, 314b are displaced away from each other and the friction engaging members 312a, 312b are brought into contact with the drum 300. Owing to the clutch function, the braking force is maintained even after stop of supply of an electric current to the parking-brake electric motor 330.

In the present embodiment, the electric actuator 328 for activating the parking brake is provided for each of the rear left and right wheels 46, 48, so that the parking braking forces applied to the respective rear left and right wheels 46, 48 can be controlled independently of each other by controlling the parking-brake electric motors 330RL, 300RR independently of each other.

As shown in FIG. 18, a parking brake ECU (PKB ECU) 350 is connected to the CAN 59. The parking brake ECU 350 is constituted mainly by a computer including an executing portion, an input/output portion and a memory portion (not shown). The parking-brake electric motors 330RL, 330RR are connected to the input/output portion via respective drive circuits (not shown).

In the rotational angle control, the parking brake ECU 350 is configured to control the parking-brake electric motors 330RL, 330RR, based on commands supplied from the brake ECU 56.

The parking-brake electric motors 330RL, 330RR may be activated either during the working states of the hydraulic brakes 50 or during the non-working states of the hydraulic brakes 50. The parking-brake electric motors 330RL, 330RR are controlled substantially in the same manner as in Embodiments 1 and 2.

Since the parking brakes are not provided for the front wheels, the yaw moment suppression control is not executed.

In the present embodiment, a parking-braking-force controlling portion is constituted by, for example, portions of the parking brake ECU 350 which are assigned to control the parking-brake electric motors 3301RL, 330RR.

Embodiment 4

Figure 20:
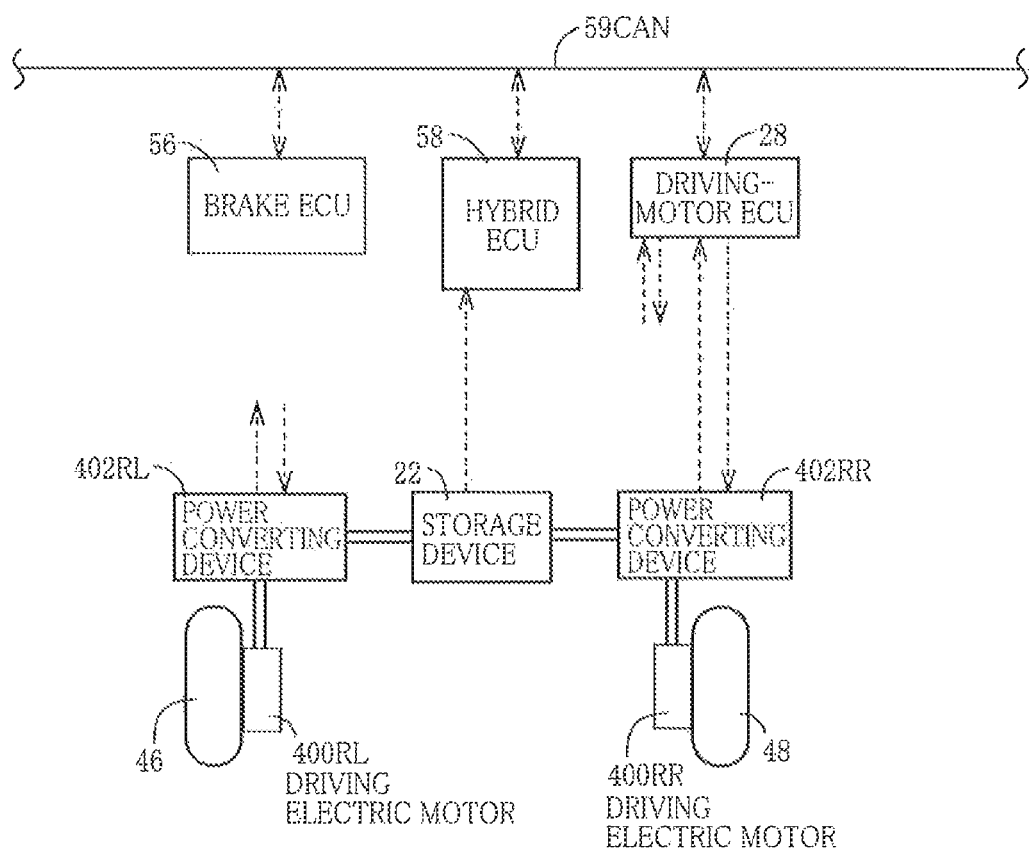
FIG. 20 is a view showing an entirety of a vehicle in which a brake system according to Embodiment 4 of the present invention is installed.

In the present embodiment, as shown in FIG. 20, the rear left and right wheels 46, 48 are constituted by respective drive wheels, and are provided with respective wheel-in motors 400RL, 400RR. By controlling the wheel-in motors 400RL, 400RR, the driving forces and the regenerative braking forces applied to the rear left and right wheels 46, 48 are controlled whereby the rotational angle control is executed.

Since the other construction is substantially the same as in Embodiments 1 and 2 or Embodiment 3, the description thereof will not be provided.

As shown in FIG. 20, power converting devices 402RL, 402RR including respective invertors are connected to the respective driving electric motors 400RL, 400RR as the wheel-in motors. The storage device 22 is also connected to the driving electric motors 400RL, 400RR.

The driving-motor ECU 28 controls the power converting devices 402RL, 402RR, based on commands supplied from the brake ECU 56.

For example, when the actual relative phase δ is smaller than the target relative phase δref, the driving force applied to the rear right wheel 48 can be increased whereby the rotational velocity of the rear right wheel 48 is increased. Thus, the relative phase 5 is increased so as to become close to the target relative phase δref.

When the active relative phase δ is larger than the target relative phase δref, the driving force applied to the rear left wheel 46 can be increased. Thus, the relative phase δ is reduced so as to become close to the target relative phase δref.

In the present embodiment, a motor controlling portion is constituted by, for example, the power converting devices 402RL, 402RR and a portion of the driving-motor ECU 28 which is assigned to control the power converting devices 402RL, 402RR.

Embodiment 5

Figure 21:
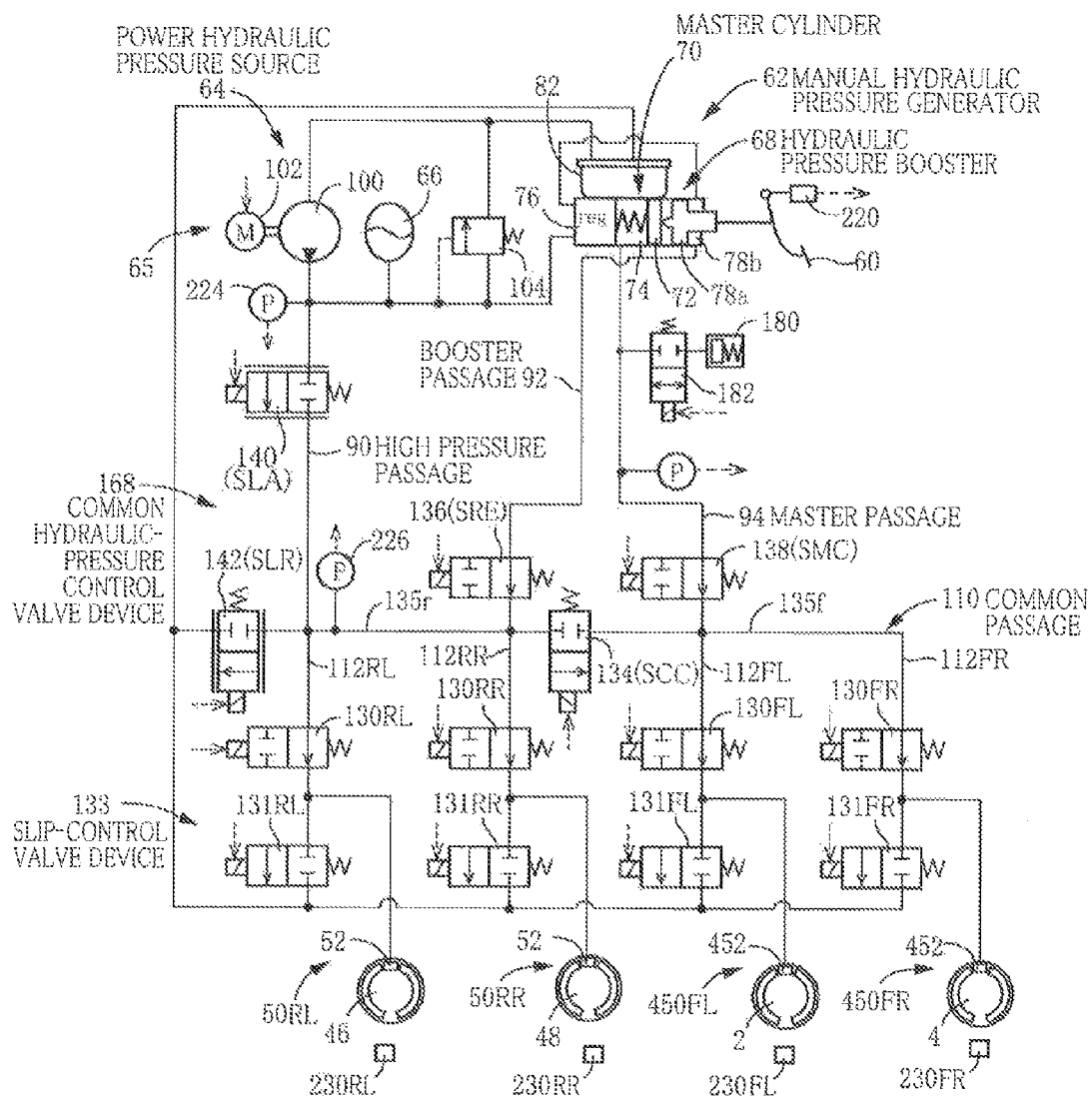
FIG. 21 is a brake hydraulic pressure circuit diagram of a brake system according to Embodiment 5 of the present invention.

The present invention is applicable also to a hydraulic brake system in which drum brakes 450FL, 450FR, 50RL, 500RR are provided for the respective front left and right wheels 2, 4 and rear left and right wheels 46, 48, as shown in FIG. 21.

In the present embodiment, four-wheels total hydraulic pressure Ps including hydraulic pressures of the brake cylinders 452FL, 452FR, 52RL, 52RR provided for the respective four wheels is detected by the common hydraulic-pressure sensor 226.

When the change-characteristic obtaining condition is satisfied, the four-wheels total hydraulic pressure Ps is detected during one rotation of the wheels, and the variance $\sigma^2$ is obtained. A change characteristic (that can be represented by, for example, a three-dimensional map) that is a relationship among the variance $\sigma^2$, a relative phase δf (=NFR−NFL) between the front left and right wheels 2, 4, a relative phase δr (=NRR−NRL) between the rear left and right wheels 46, 48 and a relative phase δrf (=NRR−NFL) between the rear right wheel 48 and the front left wheel 2, is obtained. Then, target relative phases δfref, δrref, δrfref are determined. The target relative phases δfref, δrref, δrfref are the relative phase δf between the front left and right wheels 2, 4, the relative phase 5r between the rear left and right wheels 46, 48 and the relative phase δrf between the rear right wheel 48 and the front left wheel 2, respectively, which are established when the variance $\sigma^2$ is smaller than a given value. The wheel or wheels subjected to the control are determined and the rotational angle control is executed, such that the actual relative phases δf, δr, δrf become close to the respective target relative phases δfref, δrref, δrfref.

Thus, also where the drum brakes are provided for the four wheels 2, 4, 46, 48, it is possible to suppress change of the four-wheels total hydraulic pressure Ps and accordingly to suppress the control hunting.

It is also possible to employ an arrangement in which a change characteristic relating to the relative phase between the front left and right wheels 2, 4 is obtained and the rotational angle control is executed for controlling the relative phase between the front left and right wheels 2, 4, a change characteristic relating to the relative phase between the rear left and right wheels 46, 48 is obtained and the rotational angle control is executed for controlling the relative phase between the rear left and right wheels 46, 48, and a change characteristic relating to the relative phase between the rear right wheel 48 and the front left wheel 2 is obtained and the rotational angle control is executed for controlling the relative phase between the rear right wheel 48 and the front left wheel 2.

Other Embodiments

The present invention is applicable also to a case where the friction brakes are constituted by disk brakes. Also in a disk brake, the brake cylinder pressure could be changed with rotation of the wheel, for example, due to uneven wear of a rotary disk of the disk brake. In this case, too, the change of the hydraulic pressure including brake cylinder pressures applied to a plurality of wheels can be suppressed by controlling the relative phase or phases.

Further, it is also possible to employ an arrangement in which the change of the hydraulic pressure of the brake cylinder provided for the rear left wheel 46 during one rotation of the wheel and the change of the hydraulic pressure of the brake cylinder provided for the rear right wheel 48 during one rotation of the wheel are detected independently of each other, and the detected changes are composed with each other, whereby the state of change of the rear-left/right-wheels total hydraulic pressure Ps is obtained. For example, the change of the hydraulic pressure of the brake cylinder 52RL represented by solid line in FIG. 7 and the change of the hydraulic pressure of the brake cylinder 52RR represented by broken line in FIG. 7 are obtained, and a composite waveform represented by one-dot chain line in FIG. 7 is obtained. Based on the composite waveform, the variance can be obtained and the change characteristic can be obtained.

Further, as the value representing the state of change of the total braking force during one rotation of the wheel, it is also possible to employ a maximum value of amplitude of the change of the total braking force.

Further, where the control-subjected wheel is a drive wheel, with provision of a differential limiting device via which the driving apparatus is connected to the left and right drive wheels, the rotational velocity difference can be controlled by controlling the differential limiting device.

Further, the present invention is applicable also to a brake system including an electric brake.

Moreover, the arrangement of the brake circuit is not necessarily limited to the above-described details. The present invention can be carried out not only in the above-described details but also in various modes such as any combination of Embodiments 1-4.

DESCRIPTION OF REFERENCE SIGNS

46, 48: rear wheels 50: drum brake 52: brake cylinder 56: brake ECU 130: pressure holding valve 131: pressure reducing valve 226: common hydraulic-pressure sensor 230: rotational velocity sensor 232: turning-state detecting device 234: acceleration opening-degree sensor 240: change-characteristic storing portion 330: parking-brake electric motor 350: PKB ECU 400: wheel-in motor 402: power converting device

The invention claimed is:

1. A brake system comprising:
    friction brakes provided for at least two wheels that are at least two of a plurality of wheels of a vehicle;
    a relative-phase obtaining device configured to obtain at least one relative phase each of which is a relative phase between corresponding two of the at least two wheels, wherein the relative phase is acquired on the basis of a value obtained by subtracting a rotational angle of one of the at least two wheels from a rotational angle of the other of the at least two wheels;
    a change-characteristic obtaining device configured to obtain a total-braking-force change characteristic that is a relationship between the relative phase obtained by said relative-phase obtaining device and a value representative of state of change of a total braking force during at least one rotation of the at least two wheels, the total braking force including braking forces of said friction brakes provided for the at least two wheels; and
    a rotational-angle control device configured to cause the relative phase to become close to a target relative phase by controlling a rotational angle of at least one of the at least two wheels, the target relative phase being determined based on the total-braking-force change characteristic obtained by said change-characteristic obtaining device.

2. The brake system according to claim 1, wherein said change-characteristic obtaining device includes: (a) a total-braking-force obtaining portion configured to obtain the total braking force in a state in which the relative phase obtained by said relative-phase obtaining device is constant; (b) a variance obtaining portion configured to obtain a variance of the total braking force as the value representative of state of change of the total braking force during at least one rotation of the at least two wheels, the total braking force being obtained by said total-braking-force obtaining portion; and (c) a variance-utilization change-characteristic obtaining portion configured to obtain, as the change characteristic, a relationship between the relative phase and the variance obtained by said variance obtaining portion.

3. The brake system according to claim 2, wherein said rotational-angle control device includes a target-relative-phase determining portion configured to determine the target relative phase, based on the relative phase established in a case where the variance is not larger than a given value.

4. The brake system according to claim 1,
    wherein said relative-phase obtaining device includes an obtaining portion configured to obtain the relative phase, based on a value that is obtained by subtracting a rotational angle of a second wheel as one of the corresponding two of the at least two wheels from a rotational angle of a first wheel as another of the corresponding two of the at least two wheels,
    and wherein said rotational-angle control device includes at least one of (a) a second-wheel-rotation restriction controlling portion that is configured to restrict a rotation of the second wheel relative to a rotation of the first wheel when the relative phase is smaller than the target relative phase, and (b) a first-wheel-rotation restriction controlling portion that is configured to restrict the rotation of the first wheel relative to the rotation of the second wheel when the relative phase is larger than the target relative phase.

5. The brake system according to claim 1, wherein said change-characteristic obtaining device includes a running-state-total-braking-force obtaining portion configured to obtain the total braking force upon satisfaction of a change-characteristic obtaining condition during running of the vehicle.

6. The brake system according to claim 5, wherein said running-state-total-braking-force obtaining portion is configured to obtain the total braking force upon satisfaction of the change-characteristic obtaining condition that is to be satisfied when at least one of a plurality of requirements is met, the plurality of requirements including (i) a requirement that an absolute value of difference between rotational velocities of the corresponding two of the at least two wheels is not larger than a given value, (ii) a requirement that the vehicle is not in a turn, (iii) a requirement that each of the braking forces of said friction brakes provided for the at least two wheels is not smaller than a given value and (iv) a requirement that an amplitude of change of each of target values of the braking forces of said friction brakes provided for the at least two wheels is within a given range.

7. The brake system according to claim 1, wherein said rotational-angle control device includes at least one of (a) a non-working-state controlling portion that is configured to control the rotational angle of the at least one of the at least two wheels, when each of said friction brakes provided for the at least two wheels is not in a working state, and (b) a working-state controlling portion that is configured to control the rotational angle of the at least one of the at least two wheels, when each of said friction brakes provided for the at least two wheels is in the working state.

8. The brake system according to claim 7,
wherein said rotational-angle control device includes said non-working-state controlling portion, and
wherein said non-working-state controlling portion includes a pre-activation controlling portion that is configured to control the rotational angle of the at least one of the at least two wheels when there is a possibility that said friction brakes provided for the at least two wheels are to be activated.

9. The brake system according to claim 8, wherein said pre-activation controlling portion includes: at least one of (a) a regenerative-braking-situation controlling portion that is configured to control the rotational angle of the at least one of the at least two wheels, when a regenerative braking force is being applied to each of at least one drive wheel of the vehicle without the braking forces of said friction brakes provided for the at least two wheels being applied to the at least two wheels; and (b) an acceleration-releasing-situation controlling portion that is configured to control the rotational angle of the at least one of the at least two wheels, when an operation of an acceleration operating member provided in the vehicle is released.

10. The brake system according to claim 1, wherein said rotational-angle control device includes a friction-braking-force controlling portion configured to control the rotational angle of the at least one of the at least two wheels, by controlling the braking force of at least one of said friction brakes that is provided for the at least one of the at least two wheels.

11. The brake system according to claim 10, wherein said friction-braking-force controlling portion includes a braking-force-change-rate controlling portion configured to cause the relative phase between first and second wheels as the corresponding two of the plurality of wheels to become close to the target relative phase, by controlling a relative rate that is a rate of change of the braking force of one of said friction brakes provided for the second wheel, relative to a rate of change of the braking force of another of said friction brakes provided for the second wheel.

12. The brake system according to claim 10,
wherein the at least two wheels consist of left and right wheels that are a pair of front wheels or a pair of rear wheels of the vehicle, and
wherein said friction-braking-force controlling portion is configured to control the braking force of one of said friction brakes that is provided for one of the left and right wheels,
said brake system comprising a yaw-moment suppression device configured to suppress a yaw moment acting on the vehicle, by controlling the braking force of one of said friction brakes provided for one of the plurality of wheels that is located in a position diagonal to the one of the left and right wheels.

13. The brake system according to claim 1,
wherein the at least two wheels consist of left and right wheels that are a pair of front wheels or a pair of rear wheels of the vehicle,
wherein said friction brakes provided for the left and right wheels constitute service brakes,
said brake system comprising parking brakes which are provided for the left and right wheels and which are activatable independently by respective electric actuators,
wherein said friction-braking-force controlling portion includes a parking-braking-force controlling portion configured to independently control at least one of said electric actuators that is provided for at least one of the left and right wheels so as to control the braking force of a corresponding at least one of said parking brakes that is to be activated by said at least one of said electric actuators.

14. The brake system according to claim 1,
wherein the at least two wheels consist of left and right wheels that are a pair of front wheels or a pair of rear wheels of the vehicle, and
wherein said friction brakes provided for the left and right wheels are drum brakes.

15. The brake system according to claim 1,
wherein the at least two wheels consist of two drive wheels of the vehicle,
wherein the vehicle include wheel-in motors provided for driving the respective two drive wheels,
and wherein said rotational-angle control device includes a motor controlling portion configured to control the rotational angle of at least one of the two drive wheels, by controlling a corresponding at least one of said wheel-in motors that is provided for the at least one of the two drive wheels.

16. The brake system according to claim 1, wherein said relative-phase obtaining device includes: (a) a rotational-angle detecting device configured to detect the rotational angle of each of the corresponding two of the at least two wheels, the corresponding two including first and second wheels; and (b) a relative-phase calculating portion configured to calculate the relative phase, such that, when a subtracted value obtained by subtracting the rotational angle of the second wheel from the rotational angle of the first wheel is a positive value, the calculated relative phase corresponds to the subtracted value, and such that, when the subtracted value is a negative value, the calculated relative phase corresponds to a value obtained by subtracting an absolute value of the subtracted value from a value corresponding to $2\pi$.

17. A brake system comprising:
friction brakes provided for at least two wheels that are at least two of a plurality of wheels of a vehicle;
a relative-phase obtaining device configured to obtain at least one relative phase each of which is a relative phase between corresponding two of the at least two wheels, wherein the relative phase is acquired on the basis of a value obtained by subtracting a rotational angle of one of the at least two wheels from a rotational angle of the other of the at least two wheels; and
a change-characteristic obtaining device configured to obtain a total-braking-force change characteristic that is a relationship between the relative phase obtained by said relative-phase obtaining device and a value representative of state of change of a total braking force during at least one rotation of the at least two wheels, the total braking force including braking forces of said friction brakes provided for the at least two wheels.

18. A brake system comprising:
friction brakes provided for at least two wheels that are at least two of a plurality of wheels of a vehicle;
a relative-phase obtaining device configured to obtain at least one relative phase each of which is a relative phase between corresponding two of the at least two wheels, wherein the relative phase is acquired on the basis of a value obtained by subtracting a rotational angle of one of the at least two wheels from a rotational angle of the other of the at least two wheels; and a relative-phase control device configured to control the relative phase obtained by said relative-phase obtaining device such that the relative phase is controlled to a value that causes a value representative of state of change of a total braking force to become smaller than a given value, the total braking force including braking forces of said friction brakes provided for the at least two wheels.

* * * * *